United States Patent
Li et al.

(10) Patent No.: US 9,973,419 B2
(45) Date of Patent: May 15, 2018

(54) ROUTING MANAGEMENT METHOD, ROUTING METHOD, NETWORK CONTROLLER, AND ROUTER

(71) Applicant: HUAWEI TECHNOLOGIES CO., LTD., Shenzhen (CN)

(72) Inventors: Yan Li, Beijing (CN); Xuewei Wang, Beijing (CN)

(73) Assignee: HUAWEI TECHNOLOGIES CO., LTD., Shenzen (CN)

( * ) Notice: Subject to any disclaimer, the term of this patent is extended or adjusted under 35 U.S.C. 154(b) by 188 days.

(21) Appl. No.: 14/817,656

(22) Filed: Aug. 4, 2015

(65) Prior Publication Data

US 2015/0341259 A1 Nov. 26, 2015

Related U.S. Application Data

(63) Continuation of application No. PCT/CN2014/071742, filed on Jan. 29, 2014.

(30) Foreign Application Priority Data

Feb. 4, 2013 (CN) .......................... 2013 1 0042409

(51) Int. Cl.
*H04L 12/723* (2013.01)
*H04L 12/721* (2013.01)
(Continued)

(52) U.S. Cl.
CPC ............ *H04L 45/50* (2013.01); *H04L 12/462* (2013.01); *H04L 12/4633* (2013.01);
(Continued)

(58) Field of Classification Search
CPC ....... H04L 47/825; H04L 45/66; H04L 45/50; H04L 12/4633; H04L 12/4641;
(Continued)

(56) References Cited

U.S. PATENT DOCUMENTS 6,771,662 B1 * 8/2004 Miki ................... H04L 49/3009
370/395.52
2003/0174706 A1 9/2003 Shankar et al.
(Continued)

FOREIGN PATENT DOCUMENTS

CN 1581818 2/2005
CN 1708031 12/2005
(Continued)

OTHER PUBLICATIONS

Chinese Office Action and Search Report dated Apr. 3, 2015 in corresponding Chinese Patent Application No. 201310042409.5.
(Continued)

*Primary Examiner* — Jung-Jen Liu
(74) *Attorney, Agent, or Firm* — Staas & Halsey LLP

(57) ABSTRACT

A routing management method includes: receiving, by a network controller, a request for creating a Layer 2 Virtual Private Network, determining, according to routing information of each router in a public network and information about a connection between each local area network and the public network, path information of a tunnel that a packet between any two of the local area networks should pass by when being transmitted in the public network; determining, according to the path information of each tunnel, forwarding information that each router forwards a packet along each tunnel, and allocating, to each router that each tunnel passes by, a label and processing information that is for the label before each router forwards the packet; and sending each piece of routing control information to each router, so that each router forwards the packet. The method reduces a calculation overhead of a router in a public network.

9 Claims, 5 Drawing Sheets

(51) Int. Cl.
*H04L 12/46* (2006.01)
*H04L 12/911* (2013.01)
*H04L 12/715* (2013.01)
*H04L 12/717* (2013.01)

(52) U.S. Cl.
CPC .......... *H04L 12/4641* (2013.01); *H04L 45/04* (2013.01); *H04L 45/42* (2013.01); *H04L 45/66* (2013.01); *H04L 47/825* (2013.01)

(58) Field of Classification Search
CPC ....... H04L 12/462; H04L 45/04; H04L 45/42; G06F 9/30018; G06F 9/30036; G06F 9/30032
See application file for complete search history.

(56) References Cited

U.S. PATENT DOCUMENTS

| | | |
|---|---|---|
| 2005/0097203 A1 | 5/2005 | Unbehagen et al. |
| 2006/0168279 A1* | 7/2006 | Lee .................... H04L 12/4641 709/230 |
| 2007/0127502 A1 | 6/2007 | Zhu |
| 2007/0140251 A1 | 6/2007 | Dong |
| 2008/0170578 A1* | 7/2008 | Ould-Brahim ...... H04L 12/4641 370/401 |
| 2013/0148667 A1 | 6/2013 | Hama et al. |
| 2014/0119189 A1 | 5/2014 | Lin |
| 2014/0195666 A1* | 7/2014 | Dumitriu ............ H04L 12/4625 709/223 |

FOREIGN PATENT DOCUMENTS

| | | |
|---|---|---|
| CN | 1750504 | 3/2006 |
| CN | 102301663 | 12/2011 |
| CN | 103152267 | 6/2013 |
| EP | 1 227 623 A2 | 7/2002 |
| EP | 1 753 176 A1 | 2/2007 |
| EP | 1 791 300 A1 | 5/2007 |
| EP | 2 214 352 A1 | 8/2010 |
| EP | 2 230 800 A1 | 9/2010 |
| EP | 2 549 688 A1 | 1/2013 |
| WO | 2012/023604 A1 | 2/2012 |

OTHER PUBLICATIONS

PCT International Search Report dated May 5, 2014 in corresponding International Patent Application No. PCT/CN2014/071742.
"OpenFlow Switch Specification", Open Networking Foundation, Version 1.3.1 (Wire Protocol 0x04), Sep. 6, 2012, pp. 1-128.
International Search Report dated May 5, 2014, in corresponding International Application No. PCT/CN2014/071742.
Extended European Search Report dated Apr. 29, 2016 in corresponding European Patent Application No. 14746165.1.

* cited by examiner

ROUTING MANAGEMENT METHOD, ROUTING METHOD, NETWORK CONTROLLER, AND ROUTER

CROSS-REFERENCE TO RELATED APPLICATIONS

This application is a continuation of International Application No. PCT/CN2014/071742, filed on Jan. 29, 2014, which claims priority to Chinese Patent Application No. 201310042409.5, filed on Feb. 4, 2013, both of which are hereby incorporated by reference in their entireties.

TECHNICAL FIELD

The application relates to the field of communications, and in particular, to a routing management method, a routing method, a network controller, and a router.

BACKGROUND

A Layer 2 Virtual Private Network (L2VPN) can enable multiple local area networks (LAN), distributed in geographical positions, to perform Layer 2 communication by using a public network. The public network may be, but not limited to, a public Multi-Protocol Label Switching (MPLS) network, or may be another network that can run a label protocol. For example, in FIG. 1, local area network N1 and local area network N2 belong to L2VPN A, and L2VPN A includes local area network N1, local area network N2, and a public MPLS network connected between N1 and N2. For example, N1 may be a local area network of corporation A in Beijing, N2 may be another local area network of corporation A in Shanghai, N1 and N2 may perform communication by using a public MPLS network, and N3 and N4 belong to another L2VPN B, and also perform communication by using the public MPLS network. When Layer 2 communication is performed between any two local area networks of an L2VPN, a packet transmitted between the two local area networks is encapsulated in a tunnel when passing through a public MPLS network, where the tunnel is a unidirectional link formed by routers in the public MPLS network. When the packet is transmitted in the public MPLS network, two layers of labels, namely, a tunnel label and a network label, are encapsulated. The tunnel label is used to identify a tunnel in which the packet is located when the packet is forwarded, and the network label is used to identify each local area network of the L2VPN, that is, a destination local area network to which the packet is transmitted. When being forwarded, the packet is no longer forwarded according to header information of an original packet, but is forwarded according to the label. Referring to FIG. 1, before a packet is transmitted between any two local area networks of an L2VPN, the Label Distribution Protocol (LDP) is run between all adjacent routers in a public MPLS network (for example, between PE1 and P2, and between P2 and PE2 in FIG. 1) to establish a tunnel. Then, a router that the tunnel passes by views a label resource table of the router, selects a label, not occupied by the router, as a tunnel label of the packet for future packet forwarding processing, and indicates tunnel label processing information of the router. Subsequently, the Label Distribution Protocol or the Multiprotocol Extensions for Border Gateway Protocol (MP-BGP) is run between router PE1 at a tunnel ingress and router PE2 at a tunnel egress, to determine, for PE1 and PE2, a network label of the packet for future forwarding processing, and indicate network label processing information. Each router that the tunnel passes by then accordingly generates routing control information of each router according to path information of the tunnel, a label corresponding to the router, and label processing information corresponding to the label, for each router to process and forward the packet.

In a research process of the application, the inventor finds that the prior art at least has the following defects:

A label-related protocol needs to be run between routers in a public network to determine a tunnel in which a packet is transmitted between any two local area networks of an L2VPN, and a router needs to allocate a label to the router itself, indicate label processing information, and generate routing control information of the router. As a result, a calculation overhead of the router in the public network is large.

SUMMARY

A first objective of embodiments of the application is to provide a routing management method, and a calculation overhead of a router may be reduced by using the technical solution.

A second objective of the embodiments of the application is to provide a routing method, and a calculation overhead of a router may be reduced by using the technical solution.

A third objective of the embodiments of the application is to provide a network controller, and a calculation overhead of a router may be reduced by using the technical solution.

A fourth objective of the embodiments of the application is to provide a router, and a calculation overhead of a router may be reduced by using the technical solution.

A fifth objective of the embodiments of the application is to provide another network controller, and a calculation overhead of a router may be reduced by using the technical solution.

A sixth objective of the embodiments of the application is to provide another router, and a calculation overhead of a router may be reduced by using the technical solution.

According to a first aspect, the application provides a routing management method, including:

receiving, by a network controller, a request for creating a Layer 2 Virtual Private Network, where the Layer 2 Virtual Private Network includes a public network, and at least two local area networks connected by using the public network;

determining, by the network controller according to routing information of each router in the public network and information about a connection between each local area network and the public network, path information of a tunnel that a packet between any two of the local area networks should pass by when being transmitted in the public network;

determining, according to the path information of each tunnel, forwarding information that each router forwards the packet along each tunnel, and allocating, to each router that each tunnel passes by, a label and processing information that is for the label before each router forwards the packet, where the label is a public Multi-Protocol Label Switching label; and sending each piece of routing control information to each router, where the routing control information includes: the forwarding information that each router forwards the packet along each tunnel, a label corresponding to each router in each tunnel, and the processing information that is for the label before each router forwards the packet, so that each router forwards the packet according to each piece of routing control information.

With reference to the first aspect, in a first implementation manner, before the step of sending each piece of routing control information to each router, and after the step of determining, according to the path information of each tunnel, forwarding information that each router forwards the packet along each tunnel, the method further includes:

generating a flow table of each router, where each flow table separately includes matching item information and instruction item information, and each piece of instruction item information corresponds to each piece of matching item information;

determining the matching item information in each flow table according to the label corresponding to each router in each tunnel, and the path information of each tunnel; and determining each piece of instruction item information according to the forwarding information that each router forwards the packet along each tunnel, the label corresponding to each router in each tunnel, and the processing information that is for the label before each router forwards the packet, so that after receiving the packet, the router forwards the packet according to the instruction item information, in the flow table, corresponding to the matching item information that matches the packet; and the sending each piece of routing control information to each router specifically is: sending the flow table of each router to each router.

With reference to the first implementation manner of the first aspect, in a second implementation manner, the matching item information in each flow table includes any one of or a combination of any two or more than two of the following:

a tunnel identifier of the tunnel, a label value in the packet, an ingress interface identifier of the packet, and a Virtual Switching Institution value of the Layer 2 Virtual Private Network.

With reference to the first or second implementation manner of the first aspect, in a third implementation manner, each piece of instruction item information includes any one of or a combination of any two or more than two of the following:

adding or deleting a Layer 2 header of a packet, inserting the label corresponding to the router into the packet, updating the label value in the packet as the label corresponding to the router, deleting the label in the packet, and forwarding the forwarding information of the packet.

With reference to the first aspect, or the first or second implementation manner of the first aspect, in a fourth implementation manner, the step of allocating, to each router that each tunnel passes by, a label and processing information that is for the label before each router forwards the packet includes:

allocating a network label and a tunnel label to each ingress router according to the path information of each tunnel, where the ingress router is: each edge router at each tunnel ingress, where the edge router is a router on an edge of the public network, each network label corresponds to each local area network, and each tunnel label corresponds to each tunnel in which the router is located, and the determining processing information that is for the label before each ingress router forwards the packet is: adding a Layer 2 header to a front end of a header of a frame structure of the packet, and inserting, into the packet, the network label corresponding to a destination local area network of the packet, and the tunnel label corresponding to the tunnel that the packet should pass by, so that in the frame structure of the packet, the network label is at a rear end of the tunnel label, and the Layer 2 header is at a front end of the tunnel label; and allocating each tunnel label to each transit router according to the path information of each tunnel, where each transit router is: any non-edge router in each tunnel;

the determining processing information that is for the label before each transit router forwards the packet is: updating a label value in the packet as: the tunnel label, corresponding to the transit router, in the tunnel that the packet should pass by; and the determining, according to the path information of each tunnel, processing information that is for the label before each egress router forwards the packet is: deleting the Layer 2 header, the tunnel label, and the network label that are in the packet.

According to a second aspect, the application provides a routing method, including:

receiving, by a router, a packet, where the router is in a public network, the packet is a packet, in a Layer 2 Virtual Private Network, transmitted between any two local area networks separately connected to the public network;

comparing, by the router, information about the packet with matching item information, in a flow table, prestored by the router, and using a matching item, in the flow table, matching the packet as a packet matching item, where in the flow table, each piece of instruction item information corresponds to each piece of matching item information, each piece of matching item information in the flow table includes: each piece of feature information that the packet needs to meet, and each piece of instruction item information in the flow table includes: forwarding information that the router forwards the packet, and processing information that is for the label before the router forwards the packet; and processing, by the router, the packet according to the instruction item information corresponding to the packet matching item, and forwarding the packet.

With reference to the second aspect, in a first implementation manner, the matching item information in each flow table includes any one of or a combination of any two or more than two of the following:

a tunnel identifier of the tunnel, a label value in the packet, an ingress interface identifier of the packet, and a Virtual Switching Institution value of the Layer 2 Virtual Private Network.

With reference to the second aspect, or the first implementation manner of the second aspect, in a second implementation manner, each piece of instruction item information includes any one of or a combination of any two or more than two of the following:

adding or deleting a Layer 2 header of a packet, inserting the label corresponding to the router into the packet, updating the label value in the packet as the label corresponding to the router, deleting the label in the packet, and forwarding the forwarding information of the packet.

According to a third aspect, the application provides a network controller, including a routing information acquiring unit, a tunnel management unit, a routing control information management unit, and a first transceiver unit, where the routing information acquiring unit is configured to pre-acquire routing information of each router in a public network, receive a request for creating a Layer 2 Virtual Private Network, acquire information about a connection between each local area network of the Layer 2 Virtual Private Network and the public network, and output the routing information of each router, and the information about the connection between each local area network and the public network to the tunnel management unit, where the Layer 2 Virtual Private Network includes a public network, and at least two local area networks connected by using the public network;

the tunnel management unit is configured to determine, according to the routing information of each router in the public network and the information about the connection between each local area network and the public network, path information of a tunnel that a packet between any two of the local area networks should pass by when being transmitted in the public network, and output the path information of the tunnel to the routing control information management unit;

the routing control information management unit is configured to determine, according to the path information of each tunnel, forwarding information that each router forwards the packet along each tunnel, allocate, to each router that each tunnel passes by, a label and processing information that is for the label before each router forwards the packet, and send each piece of routing control information of each router to the first transceiver unit, where the label is a public Multi-Protocol Label Switching label, and the routing control information includes: the forwarding information that each router forwards the packet along each tunnel, the label corresponding to each router in each tunnel, and the processing information that is for the label before each router forwards the packet; and the first transceiver unit is configured to send each piece of routing control information to each router, so that each router forwards the packet according to each piece of routing control information.

With reference to the third aspect, in a first implementation manner, the network controller further includes a flow table management unit, where the flow table management unit is connected between the routing control information management unit and the first transceiver unit, the flow table manager is configured to generate a flow table of each router according to the routing control information, input by the routing control information management unit, of each router, and transmit the flow table to the first transceiver unit, where the flow table of each router separately includes matching item information and instruction item information, and each piece of instruction item information corresponds to each piece of matching item information; and the first transceiver unit is configured to send the flow table of each router to each router.

With reference to the third aspect or the first implementation manner of the third aspect, in a second implementation manner, the routing control information management unit is configured to allocate, to each router that each tunnel passes by, a label and processing information that is for the label before each router forwards the packet, and is specifically configured to:

allocate a network label and a tunnel label to each ingress router according to the path information of each tunnel, where the ingress router is: each edge router at each tunnel ingress, where the edge router is a router on an edge of the public network, each network label corresponds to each local area network, and each tunnel label corresponds to each tunnel in which the router is located, and the determining processing information that is for the label before each ingress router forwards the packet is: adding a Layer 2 header to a front end of a header of a frame structure of the packet, and inserting, into the packet, the network label corresponding to a destination local area network of the packet, and the tunnel label corresponding to the tunnel that the packet should pass by, so that in the frame structure of the packet, the network label is at a rear end of the tunnel label, and the Layer 2 header is at a front end of the tunnel label; and allocate each tunnel label to each transit router according to the path information of each tunnel, where each transit router is: any non-edge router in each tunnel;

the determining processing information that is for the label before each transit router forwards the packet is: updating a label value in the packet as: the tunnel label, corresponding to the transit router, in the tunnel that the packet should pass by; and the determining, according to the path information of each tunnel, processing information that is for the label before each egress router forwards the packet is: deleting the Layer 2 header, the tunnel label, and the network label that are in the packet.

According to a fourth aspect, the application provides a router, including: a second transceiver unit, a flow table storage unit, a packet comparison unit, and a packet processing unit, where the second transceiver unit is configured to perform external communication, where the communication includes receiving a flow table of the router, and receiving and forwarding a packet, where the packet is a packet, in a Layer 2 Virtual Private Network, transmitted between any two local area networks separately connected to the public network;

the storage unit is configured to store information, where the information includes: the flow table of the router, where in the flow table, each piece of instruction item information corresponds to each piece of matching item information, each piece of matching item information in the flow table includes: each piece of feature information that the packet needs to meet, and each piece of instruction item information in the flow table includes: forwarding information that the router forwards the packet, and processing information that is for the label before the router forwards the packet;

the packet comparison unit is configured to compare information about the packet with the matching item information in the flow table, and use a matching item, in the flow table, matching the packet as a packet matching item; and the packet processing unit processes the packet according to the instruction item information corresponding to the packet matching item.

According to a fifth aspect, the application provides a network controller, including a routing information acquirer, a tunnel manager, a routing control information manager, and a first transceiver, where the routing information acquirer is configured to pre-acquire routing information of each router in a public network, receive a request for creating a Layer 2 Virtual Private Network, acquire information about a connection between each local area network of the Layer 2 Virtual Private Network and the public network, and output the routing information of each router, and the information about the connection between each local area network and the public network to the tunnel manager, where the Layer 2 Virtual Private Network includes a public network, and at least two local area networks connected by using the public network;

the tunnel manager is configured to determine, according to the path information of each tunnel, forwarding information that each router forwards the packet along each tunnel, allocate, to each router that each tunnel passes by, a label and processing information that is for the label before each router forwards the packet, where the label is a public Multi-Protocol Label Switching label, and output path information of the tunnel to the routing control information manager;

the routing control information manager is configured to determine, according to the path information of each tunnel, forwarding information that each router forwards the packet along each tunnel, allocate, to each router that each tunnel passes by, a label and processing information that is for the label before each router forwards the packet, and send each piece of routing control information of each router to the first transceiver, where the label is a public Multi-Protocol Label Switching label, and the routing control information includes: the forwarding information that each router forwards the packet along each tunnel, the label corresponding to each router in each tunnel, and the processing information that is for the label before each router forwards the packet; and the first transceiver is configured to send each piece of routing control information to each router, so that each router forwards the packet according to each piece of routing control information.

With reference to the fifth aspect, in a first implementation manner, the network controller further includes a flow table manager, where the flow table manager is connected between the routing control information manager and the first transceiver, the flow table manager is configured to generate a flow table of each router according to the routing control information, input by the routing control information manager, of each router, and transmit the flow table to the first transceiver, where the flow table of each router separately includes matching item information and instruction item information, and each piece of instruction item information corresponds to each piece of matching item information; and the first transceiver is configured to send the flow table of each router to each router.

With reference to the fifth aspect or the first implementation manner of the fifth aspect, in a second implementation manner, the routing control information manager is configured to allocate, to each router that each tunnel passes by, a label and processing information that is for the label before each router forwards the packet, and is specifically configured to:

allocate a network label and a tunnel label to each ingress router according to the path information of each tunnel, where the ingress router is: each edge router at each tunnel ingress, where the edge router is a router on an edge of the public network, each network label corresponds to each local area network, and each tunnel label corresponds to each tunnel in which the router is located, and the determining processing information that is for the label before each ingress router forwards the packet is: adding a Layer 2 header to a front end of a header of a frame structure of the packet, and inserting, into the packet, the network label corresponding to a destination local area network of the packet, and the tunnel label corresponding to the tunnel that the packet should pass by, so that in the frame structure of the packet, the network label is at a rear end of the tunnel label, and the Layer 2 header is at a front end of the tunnel label; and allocate each tunnel label to each transit router according to the path information of each tunnel, where each transit router is: any non-edge router in each tunnel;

the determining processing information that is for the label before each transit router forwards the packet is; updating a label value in the packet as: the tunnel label, corresponding to the transit router, in the tunnel that the packet should pass by; and the determining, according to the path information of each tunnel, processing information that is for the label before each egress router forwards the packet is: deleting the Layer 2 header, the tunnel label, and the network label that are in the packet.

According to a sixth aspect, the application provides a router, including: a second transceiver, a flow table memory, a packet comparator, and a packet processor, where the second transceiver is configured to perform external communication, where the communication includes receiving a flow table of the router, and receiving and forwarding a packet, where the packet is a packet, in a Layer 2 Virtual Private Network, transmitted between any two local area networks separately connected to the public network;

the memory is configured to store information, where the information includes: the flow table of the router, where in the flow table, each piece of instruction item information corresponds to each piece of matching item information, each piece of matching item information in the flow table includes: each piece of feature information that the packet needs to meet, and each piece of instruction item information in the flow table includes: forwarding information that the router forwards the packet, and processing information that is for the label before the router forwards the packet;

the packet comparator is configured to compare information about the packet with the matching item information in the flow table, and use a matching item, in the flow table, matching the packet as a packet matching item; and the packet processor processes the packet according to the instruction item information corresponding to the packet matching item.

As can be seen from the foregoing, according to the technical solutions of the embodiments, a network controller may be used to implement centralized management on routers in a public network, and routing information of each router in the public network and information about a connection between each router on a network edge of the public network and any local area network are acquired, so as to determine path information of a tunnel that a packet transmitted between any two local area networks of an L2VPN should pass by, and then, to determine routing control information of each router, including forwarding information that each router forwards a packet along the tunnel, a label allocated by each router, and processing information that is for the label, and the routing control information of each router is sent to each router for storage, so that each router forwards the packet according to the routing control information of the router. In the prior art, in this process, only by running a label-related protocol between routers in a public network, a tunnel that a transmitted packet needs to pass by can be determined, so as to allocate a label and label processing information to the router, and generate corresponding routing control information of the router. Compared with the prior art, in the embodiments, when generating control information of the router in the public network, the router does not need to calculate a label protocol, and therefore, in the embodiments, a calculation overhead of the router in the public network is reduced.

BRIEF DESCRIPTION OF DRAWINGS

To describe the technical solutions in the embodiments of the application or in the prior art more clearly, the following briefly introduces the accompanying drawings required for describing the embodiments or the prior art. Apparently, the accompanying drawings in the following description show merely some embodiments of the application, and a person of ordinary skill in the art may still derive other drawings from these accompanying drawings without creative efforts.

DESCRIPTION OF EMBODIMENTS

The following clearly describes the technical solutions in the embodiments of the application with reference to the accompanying drawings in the embodiments of the application. Apparently, the described embodiments are merely some but not all of the embodiments of the application. All other embodiments obtained by a person of ordinary skill in the art based on the embodiments of the application without creative efforts shall fall within the protection scope of the application.

Embodiment 1

Figure 2:
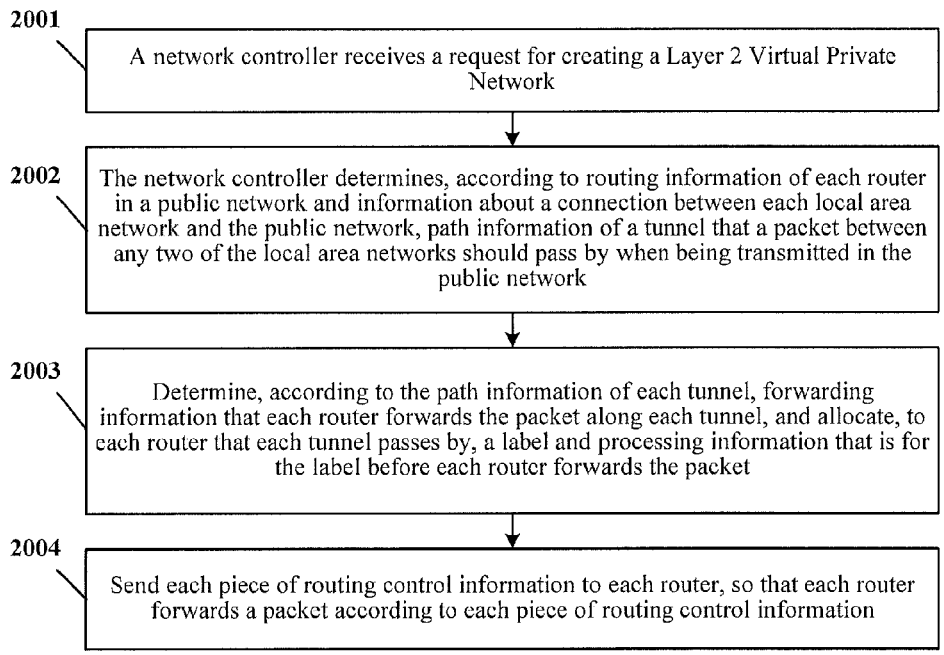
FIG. 2 is a schematic flowchart of a routing management method according to Embodiment 1 of the application.

Referring to FIG. 2, this embodiment provides a routing management method, and an application scenario of the method may be transmitting, by using a public network, a data packet between two local area networks, of a same L2VPN, distributed in two geographical positions.

Steps of a process of the routing management method provided in this embodiment are as follows:

Step 2001: A network controller receives a request for creating a Layer 2 Virtual Private Network.

In this embodiment, a public network may be, but not limited to, a public Multi-Protocol Label Switching (MPLS) network, or may be another Internet that can run a label protocol. A Layer 2 Virtual Private Network to be created includes a public network, and at least two local area networks connected by using the public network. When an L2VPN is requested to be created, parameters of the L2VPN need to be provided, where the parameters include: the number of local area networks that are separated in geographical positions and are included in the L2VPN, and information about a connection between each local area network and the public network. The information about the connection between each local area network and the public network specifically refers to which interface of a router on an edge of the public network these local area networks are separately connected to, where the interface may be a physical interface or a logical interface. In addition, as a management apparatus of the router in the public network, the network controller pre-acquires routing information of each router.

Step 2002: The network controller determines, according to routing information of each router in a public network and information about a connection between each local area network and the public network, path information of a tunnel that a packet between any two of the local area networks should pass by when being transmitted in the public network.

In this embodiment, the network controller pre-acquires the routing information of each router in the public network, where the routing information of the router records which router the router is directly connected to by using which interface. After receiving the request for creating a Layer 2 Virtual Private Network, the network controller calculates, according to the routing information of each router in the public network and the information about the connection between each local area network and the public network, path information of a tunnel that a packet between any two local area networks should pass by when being transmitted in the public network. The path information of the tunnel includes: which routers the packet passes by when being transmitted in the tunnel, and which interface of the router the packet passes by.

Step 2003: Determine, according to the path information of each tunnel, forwarding information that each router forwards the packet along each tunnel, and allocate, to each router that each tunnel passes by, a label and processing information that is for the label before each router forwards the packet.

In this embodiment, the determining, according to the path information of each tunnel, forwarding information that each router forwards the packet along each tunnel specifically is: determining, by the network controller according to the path information of each tunnel, which interface of the router is used to forward the packet to a next router along the tunnel by each router that each tunnel passes by.

In the public network, the network controller needs to allocate, to each router that each tunnel passes by, the label and the processing information that is for the label according to the path information of each tunnel of the L2VPN. A fixed number of labels for identifying different information may be allocated, according to a preset requirement of a forwarding function of the router and a label encapsulation technology, to the router of the tunnel that the packet passes by. The processing information that is for the label includes: inserting a label into the packet, or updating the label or deleting the label.

In an application scenario of the L2VPN, to meet basic requirements of forwarding a packet between any two local area networks of the L2VPN, the label is classified into a network label and a tunnel label, where the network label is used to identify a local area network, and the tunnel label is used to identify a tunnel. The label and the processing information that is for the label before each router forwards the packet may be allocated according to the following steps to each router that each tunnel passes by:

a. Allocate a network label and a tunnel label to each ingress router according to the path information of each tunnel.

Each network label separately corresponds to each local area network, and each tunnel label corresponds to each tunnel in which the router is located. The ingress router is each edge router at each tunnel ingress, and the edge router is a router on an edge of the public network.

Figure 1:
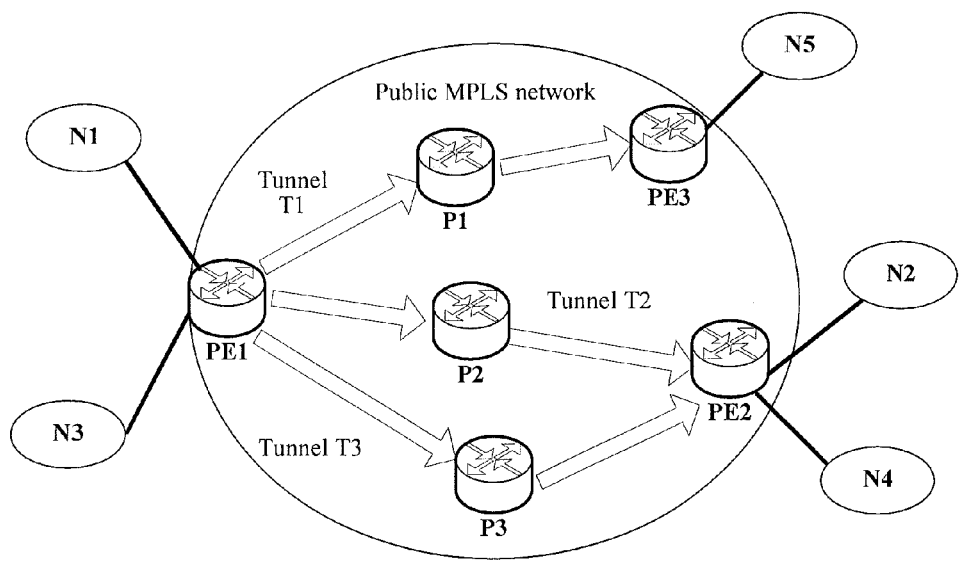
FIG. 1 is schematic topological diagram in which a public Multi-Protocol Label Switching network is connected to a local area network of a Layer 2 Virtual Private Network.

For example, referring to FIG. 1, if L2VPN A includes local area networks N1 and N2, after determining tunnel T2 in which N1 sends a packet to N2, the network controller allocates a network label and a tunnel label to ingress router PE1. It is assumed that a label value of the network label is 201, used to identify that a destination local area network in which PE1 receives the packet of N1 is N2; and it is assumed that a label value of the tunnel label is 11, used to identify that PE1 is located in tunnel T2.

If L2VPN C includes 3 local area networks: N1, N2, and N5, after tunnel T2 in which N1 sends a packet to N2, and tunnel T1 in which N1 sends a packet to N5 are determined, two network labels and two tunnel labels are allocated to ingress router PE1. It is assumed that label values of the network labels are separately 201 and 101, where the network label 201 is used to identify that a destination local area network in which PE1 receives the packet of N1 is N2, and the network label 101 is used to identify destination local area network N5 of the packet; and label values of the tunnel labels are separately 11 and 21, where the tunnel label 11 identifies tunnel T2, and the tunnel label 21 identifies tunnel T1.

b. The determining processing information that is for the label before each ingress router forwards the packet is: adding a Layer 2 header to a front end of a header of a frame structure of the packet, and inserting, into the packet, the network label corresponding to a destination local area network of the packet, and the tunnel label corresponding to the tunnel that the packet should pass by, so that in the frame structure of the packet, the network label is at a rear end of the tunnel label, and the Layer 2 header is at a front end of the tunnel label.

The network controller determines that label processing information of the ingress router is: the ingress router adds a Layer 2 header to a header of a frame structure of a packet, where the Layer 2 header includes, but not limited to, an Ethernet Layer 2 header, and a point-to-point protocol Layer 2 header, and is used for Layer 2 communication of the packet in the public network; and the ingress router inserts a tunnel label and a network label behind the Layer 2 header, where the network label is at a rear end of the tunnel label.

For example, referring to FIG. 1, if L2VPN A includes local area networks N1 and N2, a label value of a network label of PE1 in tunnel T2 is 201, and a label value of a tunnel label is 11. The network controller further determines that processing information that is for the label of PE1 is: PE1 receives a packet sent by N1 to N2, adds one Ethernet Layer 2 header at a front end of a header of a frame structure of the packet, and inserts a tunnel label 11 and a network label 201 behind the Ethernet Layer 2 header, where the network label 201 is at a rear end of the tunnel label 11.

c. Allocate each tunnel label to each transit router according to the path information of each tunnel.

The transit router is any non-edge router in each tunnel, and the tunnel label of the transit router identifies a tunnel in which the transit router is located.

For example, referring to FIG. 1, if L2VPN A includes local area networks N1 and N2, after determining tunnel T2 in which N1 sends a packet to N2, the network controller allocates a tunnel label corresponding to tunnel T2 to transit router P2, and sets the label value to 12. When the transit router is located in several tunnels, the network controller accordingly allocates several tunnel labels to the network controller. Referring to FIG. 1, a tunnel in which N2 sends a packet to N1 may include router P2, or may not include router P2. When P2 is in a tunnel in which N2 sends a packet to N1, the network controller needs to allocate a corresponding tunnel label.

d. The determining processing information that is for the label before each transit router forwards the packet is: updating the label value in the packet as: the tunnel label, of the transit router, corresponding to the tunnel that the packet should pass by.

For example, referring to FIG. 1, if L2VPN A includes local area networks N1 and N2, a label value of a tunnel label allocated by transit router P2 in tunnel T2 is 12. After receiving the packet forwarded by PE1, P2 updates the tunnel label 11 in the packet as the tunnel label 12.

e. The determining, according to the path information of each tunnel, processing information that is for the label before each egress router forwards the packet is: deleting the Layer 2 header, the tunnel label, and the network label that are in the packet.

For example, referring to FIG. 1, if L2VPN A includes local area networks N1 and N2, after receiving the packet forwarded by P2, egress router PE2 in tunnel T2 deletes the Ethernet Layer 2 header, the tunnel label 12, and the network label 201 that are in the packet.

Step 2004: Send each piece of routing control information to each router, so that each router forwards a packet according to each piece of routing control information.

The routing control information includes: forwarding information that each router forwards the packet along each tunnel, a label corresponding to each router in each tunnel, and the processing information that is for the label before each router forwards the packet.

The routing management method provided in this embodiment is described below by using a topology in FIG. 1, and is applied to an application scenario of an L2VPN.

The network controller (not shown in the figure) pre-acquires routing information of routers PE1, PE2, PE3, P1, P2, and P3 in public MPLS, for example, the routing information of PE1 is: which interfaces on PE1 are used by PE1 to connect to routers P1, P2, and P3.

The network controller receives a request for creating an L2VPN, and acquires information about a connection between a local area network of the Layer 2 Virtual Private Network and an edge router in the public MPLS network. It is assumed that L2VPN A only includes two local area networks N1 and N2, and it is assumed that N1 is connected to interface 2 of PE1, and N2 is connected to interface 5 of PE2.

The network controller separately calculates, according to the received routing information of each router and information about the connection between the local area network of the Layer 2 Virtual Private Network and the edge router of the public MPLS network, path information of a tunnel in which N1 forwards a packet to N2 and path information of a tunnel in which N2 forwards a packet to N1. Herein, only a direction in which N1 forwards a packet to N2 is used as an example, and it is assumed that a corresponding tunnel is T2, and path information of tunnel T2 is: tunnel T2 reaches P2 from interface 1 of PE1, and then reaches PE2 from interface 2 of P2.

The network controller further determines routing control information of each router that each tunnel passes by.

Tunnel T2 in which N1 forwards a packet to N2 is used as an example:

According to path information of tunnel T2, it is determined that the forwarding information that edge router PE1 forwards the packet along the tunnel is: PE1 forwards a packet from interface 1 to P2, and that forwarding information of P2 is: P2 forwards the packet to PE2 from interface 2.

A network label is allocated to ingress router PE1, and it is assumed that the label value is 201, where the network label 201 identifies that a destination local area network in which PE1 receives the packet of N1 is N2.

Tunnel labels are allocated to ingress router PE1 and transit router P2 that is in a tunnel. It is assumed that a label value of the tunnel label allocated to PE1 is 11, which identifies that PE1 is located in tunnel T2; and it is assumed that a tunnel label value of the tunnel label allocated to P2 is 12, which identifies that P2 is located in tunnel T2.

The label processing information corresponding to ingress router PE1 is determined as: inserting the Layer 2 header, the network label 201, and the tunnel label 11 into the packet.

The label processing information corresponding to transit router P2 in the tunnel is determined as: updating, according to the tunnel label corresponding to P2 being the tunnel label 12, a tunnel label of a packet received by P2 and having a tunnel label being 11 as the tunnel label 12.

The label processing information corresponding to egress router PE2 is determined as: deleting the Layer 2 header, the network label 201, and the tunnel label 12.

The network controller sends, to a corresponding router by using a network protocol, the routing control information of each router that tunnel T2 passes by, so that each router forwards a packet according to the routing control information of the router. The principle of the remaining tunnels is similar to that of T2, and no example is provided.

As can be seen from the foregoing, according to the technical solution of this embodiment, a network controller may be used to implement centralized management on routers in a public network, and routing information of each router in the public network and information about a connection between each router on a network edge of the public network and any local area network are acquired, so as to determine path information of a tunnel that a packet transmitted between any two local area networks of an L2VPN should pass by, and then, to determine routing control information of each router, including forwarding information that each router forwards a packet along the tunnel, a label allocated by each router, and processing information that is for the label, and the routing control information of each router is sent to each router for storage, so that each router forwards the packet according to the routing control information of the router. In the prior art, in this process, only by running a label-related protocol between routers in a public network, a tunnel that a transmitted packet needs to pass by can be determined, so as to allocate a label and label processing information to the router, and generate corresponding routing control information of the router. Compared with the prior art, in this embodiment, when generating control information of the router in the public network, the router does not need to calculate a label protocol, and therefore, in this embodiment, a calculation overhead of the router in the public network is reduced.

Embodiment 2

Figure 3:
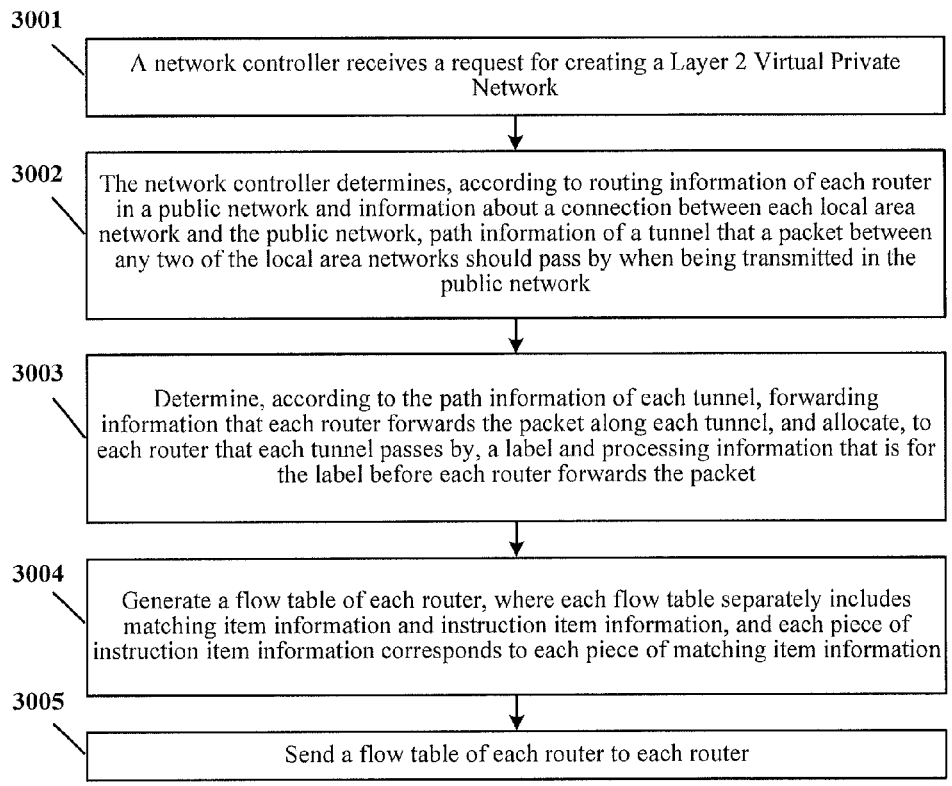
FIG. 3 is a schematic flowchart of a routing management method according to Embodiment 2 and Embodiment 3 of the application.

Referring to FIG. 3, this embodiment provides a routing management method, and an application scenario of the method may be transmitting, by using a public network, a data packet between two local area networks, of a same L2VPN, distributed in two geographical positions. The public network may be, but not limited to, a public MPLS network, and may also be another Internet that can run a label protocol.

Steps of a process of the method provided in this embodiment are as follows:

Step 3001: A network controller receives a request for creating a Layer 2 Virtual Private Network.

Step 3002: The network controller determines, according to routing information of each router in a public network and information about a connection between each local area network and the public network, path information of a tunnel that a packet between any two of the local area networks should pass by when being transmitted in the public network.

Step 3003: Determine, according to the path information of each tunnel, forwarding information that each router forwards the packet along each tunnel, and allocate, to each router that each tunnel passes by, a label and processing information that is for the label before each router forwards the packet.

In this embodiment, the foregoing steps 3001 to 3003 are the same as steps 2001 to 2003 provided in Embodiment 1, and for details, refer to Embodiment 1, which are not further provided herein.

Step 3004: Generate a flow table of each router, where each flow table separately includes matching item information and instruction item information, and each piece of instruction item information corresponds to each piece of matching item information.

In this embodiment, routing control information of routers which is in various forms in conventional routers is uniformly abstracted as a flow table (Table), and according to a forwarding function of the router, different routers may have different quantities of flow tables.

A format of a flow table may be simplified as the form shown in Table 1:

TABLE 1

| Format of flow table | |
| --- | --- |
| Matching item information | Instruction item information |

The matching item information column includes one or more matching items, and each matching item describes one feature of a packet, and is used to represent a matching condition that a packet to be processed by a router needs to meet; the instruction item information column includes one or more instructions, used to represent that the router performs instruction-related processing on the packet that meets the matching condition described in the matching item information column.

In this embodiment, to transmit a packet between any two local area networks of the L2VPN by using a public network, the network controller determines matching item information in each flow table according to a label corresponding to each router in each tunnel and path information of each tunnel, and determines each piece of instruction item information according to the forwarding information that each router forwards the packet along each tunnel, the label corresponding to each router in each tunnel, and processing information that is for the label before each router forwards the packet, so that after receiving the packet, the router forwards the packet according to instruction item information, in the flow table, corresponding to matching item information that matches the packet.

The matching item information in each flow table includes any one of or a combination of any two or more than two of the following:

a tunnel identifier of the tunnel, a label value in the packet, an ingress interface identifier of the packet, and a Virtual Switching Institution value of the Layer 2 Virtual Private Network.

In this embodiment, the matching item information in the flow table defines at least the following:

IN_PORT: using an ingress interface identifier of a packet, that is, an input interface identifier of the packet on the router, as a matching condition for the router to process the packet, for example, when the matching item information column is "IN_PORT=2", the router only performs a related instruction operation in instruction item information on a packet received from interface 2;

TUNNEL_ID: using a tunnel identifier of a tunnel that a packet transmitted in a public network passes by as a matching condition for the router to process the packet, for example, when the matching item information column is "TUNNEL_ID=T2", the router only performs a related instruction operation in instruction item information on a packet whose tunnel identifier is T2;

IN_LABEL: using a label value in a packet, specifically, a label value of a label behind a Layer 2 header in the packet, as a matching condition for the router to process the packet, for example, when the matching item information column is "IN_LABEL=201", the router only performs a related instruction operation in instruction item information on such a packet that a label value of a label behind a Layer 2 header in the packet is 201;

VSI: using a Virtual Switching Institution (VSI) value of a Layer 2 Virtual Private Network in which a packet is located, as a matching condition for the router to process the packet, where the VSI is used to identify the Layer 2 Virtual Private Network, the VSI value may be obtained by mapping an ingress interface identifier of a packet of an ingress router at any tunnel ingress, or obtained by mapping a network label of a packet of a router at any tunnel egress. For example, referring to FIG. 1, assuming that L2VPN C includes local area networks N1, N2, and N5, and an VSI of L2VPN C is V1, a packet transmitted between any two local area networks of L2VPN C may be identified by using VSI=V1, and if the matching item information column is "VSI=V1", the router only performs a related instruction operation in instruction item information on the packet transmitted between any two local area networks of L2VPN C; and MAC: using a destination Medium Access Control (MAC) address of a packet as a matching condition for the router to process the packet, where the MAC address corresponds to a network device in one local area network in an L2VPN.

Each piece of instruction item information includes any one of or a combination of any two or more than two of the following:

adding or deleting a Layer 2 header of a packet, inserting the label corresponding to the router into the packet, updating the label value in the packet as the label corresponding to the router, deleting the label in the packet, and forwarding the forwarding information of the packet.

Specifically, in this embodiment, the instruction item information in the flow table defines: APPLY_ACTIONS{ADD_xx_HDR}/APPLY_ACTIONS {DEL_xx_HDR}:

adding or deleting a Layer 2 header of a packet, to add/delete one Layer 2 header to/from a front end of a header of a frame structure of a packet meeting a matching condition described in the matching item information in the flow table, where the added or deleted Layer 2 header may be, but not limited to, an Ethernet Layer 2 header, a point-to-point protocol Layer 2 header, or the like. For example, when an Ethernet header is added, the instruction corresponds to APPLY_ACTIONS{ADD_ETH_HDR}, and when the Ethernet header is deleted, the instruction corresponds to APPLY_ACTIONS{DEL_ETH_HDR};

APPLY_ACTIONS {OUTPUT( )}: forwarding the forwarding information of the packet, to forward, from an interface of a router, a packet meeting a matching condition described in the matching item information in the flow table. For example, the instruction item information being APPLY_ACTIONS{OUTPUT(5)} in the flow table indicates that the router forwards the packet from interface 5;

APPLY_ACTIONS{PUSH_MPLS( )}: inserting a label corresponding to the router into the packet, to insert a label behind a header of a packet meeting a matching condition described in the matching item information in the flow table. For example, the instruction item information being APPLY_ACTIONS{PUSH_MPLS (201)} in the flow table indicates that the router inserts a label, having a label value being 201, behind the header of the packet;

APPLY_ACTIONS{SET_MPLS_LABEL( )}: updating a label value in the packet as a label corresponding to the router, to update a label behind a header of a packet meeting a matching condition described in the matching item information in the flow table. For example, the instruction item information being APPLY_ACTIONS{SET_MPLS_LABEL (12)} in the flow table indicates that the router updates a label value of a label behind the header of the packet as 12; and APPLY_ACTIONS{POP_MPLS}: deleting a label in a packet, to delete a label behind a header of a packet meeting a matching condition described in the matching item information in the flow table.

When the flow table in the router includes at least two flow tables, the instruction item information in the flow table further defines a GOTO_TABLE( ) instruction, used to perform a goto operation on flow tables. For example, a router includes Table 0 and Table 5, and when instruction item information in Table 0 contains GOTO_TABLE(5), it indicates that the router goes to Table 5 from Table 0 and executes Table 5.

The instruction item information in the flow table further defines an instruction of write metadata (WRITE_METADATA), which is used to transmit data between flow tables. For example, the router includes flow table 1 and flow table 3, and when instruction item information in flow table 1 includes WRITE_METADATA(S1) and GOTO_TABLE(3), flow table 3 may use data S1 as a value of a matching condition in matching item information in flow table 3.

In addition, the flow table further defines many other matching items and instruction items, which cannot be all listed herein in view of limited space.

Using a topology in FIG. 1 as an example, it is assumed that L2VPN A includes two local area networks N1 and N2, where, if a Layer 2 Virtual Private Network only includes two local area networks, the Layer 2 Virtual Private Network is generally referred to as a virtual leased line (VLL). It is assumed that N1 is connected to interface 2 of PE1, and N2 is connected to interface 5 of PE2. It is assumed that determined path information of a tunnel in a direction in which N1 forwards a packet to N2 is: the tunnel reaches P2 from interface 1 of PE1, and then reaches PE2 from interface 2 of P2. A label value of a network label allocated to edge router PE1 that the tunnel passes by is 201, a label value of a tunnel label of PE1 is 11, and label processing information is: adding an Ethernet Layer 2 header, inserting the tunnel label 11, and inserting the network label 201. A label value of a tunnel label of P2 is 12, processing information of the tunnel label is updating a label, and P2 receives a packet having a tunnel label being 11, and updates the label value of the tunnel label of the packet as 12; and PE2 deletes the Ethernet Layer 2 header, the tunnel label, and the network label.

The generated flow table of each router may specifically be shown in the following Table 2:

TABLE 2

Flow table of each router that tunnel T2 in a VLL passes by

| Flow table | Entry | |
|---|---|---|
| | Matching item information | Flow table item information |
| PE1 Table 0 | IN_PORT = 2 | APPLY_ACTIONS{ ADD_ETH_HDR, PUSH_MPLS(201), ... } WRITE_METADATA(T2) GOTO_TABLE(5) |
| PE1 Table 5 | TUNNEL_ID = T2 | APPLY_ACTIONS{ PUSH_MPLS(11), ..., OUTPUT(1) } |
| P2 Table 6 | IN_LABEL = 11 | APPLY_ACTIONS{ SET_MPLS_LABEL(12), ..., OUTPUT(2) } |
| PE2 Table 6 | IN_LABEL = 12 | APPLY_ACTIONS{ POP_MPLS, ... } GOTO_TABLE(7) |
| PE2 Table 7 | IN_LABEL = 201 | APPLY_ACTIONS{ POP_MPLS, DEL_ETH_HDR, OUTPUT(5) } |

Using a topology in FIG. 1 as an example, it is assumed that L2VPN C includes 3 local area networks: N1, N2, and N5, where if a quantity of local area networks of a Layer 2 Virtual Private Network is greater than or equal to 3, the Layer 2 Virtual Private Network is referred to as a virtual private local area network service (VPLS). It is assumed that a VSI value of the Layer 2 Virtual Private Network is V1. Herein, only a flow table in a direction in which N1 forwards a packet to N2 is used for description, and flow tables of routers in other directions may be deduced by analogy. Moreover, it is assumed that the tunnel in a direction in which N1 forwards a packet to N2 and a label allocation situation corresponding to the router that the tunnel passes by are the same as those in the examples used in the foregoing Table 2. The generated flow table of each router is shown in the following Table 3:

TABLE 3

Flow table of each router that tunnel T2 in a VPLS passes by

| Flow table | Entry | |
|---|---|---|
| | Matching item information | Instruction item information |
| PE1 Table 0 | IN_PORT = 2 | WRITE_METADATA(V1) GOTO_TABLE(1) |
| PE1 Table 1 | VSI = V1 MAC = xx | APPLY_ACTIONS{ ADD_ETH_HDR, PUSH_MPLS(201), ...} WRITE_METADATA(T2) GOTO_TABLE(5) |
| PE1 Table 5 | TUNNEL_ID = T2 | APPLY_ACTIONS{ PUSH_MPLS(11), ..., OUTPUT(1) } |
| P2 Table 6 | IN_LABEL = 11 | APPLY_ACTIONS{ SET_MPLS_LABEL(12), ..., OUTPUT(2) } |
| PE2 Table 6 | IN_LABEL = 12 | APPLY_ACTIONS{ POP_MPLS, ... } GOTO_TABLE(7) |
| PE2 Table 7 | IN_LABEL = 201 | APPLY_ACTIONS{ POP_MPLS, DEL_ETH_HDR } WRITE_METADATA(V1) GOTO_TABLE(1) |
| PE2 Table 1 | VSI = V1 MAC = xx | APPLY_ACTIONS{ OUTPUT(5) } |

In Table 3, "xx" in matching item information "MAC=xx" in flow table 1 of PE1 and flow table 1 of PE2 is: a destination Medium Access Control address of the packet being a Medium Access Control address of any network device in N2.

Step 3005: Send a flow table of each router to each router.

The network controller sends the flow table of each router to each router, so that each router forwards a packet according to the flow table.

As can be seen from the foregoing, in addition to the beneficial effects of Embodiment 1, this embodiment further has the following beneficial effects:

Routing control information of a router is uniformly abstracted as flow table information, to facilitate centralized management on the routing control information, and facilitate extension of the routing control information, so that the router provides more functions, to meet forwarding requirements of different packets.

Embodiment 3

Referring to FIG. 3, this embodiment provides a routing management method, and an application scenario of the method may be transmitting, by using a public network, a data packet between two local area networks, of a same L2VPN, distributed in two geographical positions. The public network may be, but not limited to, a public MPLS network, and may also be another Internet that can run a label protocol.

Steps of a process of the method provided in this embodiment are as follows:

Step 3001: A network controller receives a request for creating a Layer 2 Virtual Private Network.

The L2VPN includes a public network, and at least two local area networks connected to the public network. When an L2VPN is requested to be created, parameters of the L2VPN need to be provided to the network controller, where the parameters of the L2VPN include: the number of local area networks that are separated in geographical positions and are included in the L2VPN, and information about a connection between each local area network and the public network. The information about the connection between each local area network and the public network specifically refers to: which interface of a router on an edge of the public network these local area networks are separately connected to, where the interface may be a physical interface or a logical interface.

Specifically, referring to FIG. 1, using L2VPN C as an example, it is assumed that L2VPN C includes 3 local area networks: N1, N2, and N5, that are separated in geographical positions. When L2VPN C is requested to be created, the network controller needs to acquire information about a connection between N1 and a public MPLS network, information about a connection between N2 and the public MPLS network, and information about a connection between N5 and the public MPLS network. Herein, it is specifically assumed that the provided parameter includes: local area network N1 is connected to interface 2 of edge router PE1 of the public MPLS network; local area network N2 is connected to interface 5 of edge router PE2; and local area network N5 is connected to interface 3 of edge router PE3.

In addition, as a management apparatus of the router in the public network, the network controller pre-acquires routing information of each router. The routing information of each router in the public network records which router each interface of each router is connected to. For example, referring to FIG. 1, routing information of router PE1 includes: interface 3 of PE1 is connected to P1, interface 1 of PE1 is connected to P2, interface 4 of PE1 is connected to router P3, and the like.

Step 3002: The network controller determines, according to routing information of each router in a public network and information about a connection between each local area network and the public network, path information of a tunnel that a packet between any two of the local area networks should pass by when being transmitted in the public network.

The network controller calculates, according to the pre-acquired routing information of each router in the public network and information about the connection between each local area network and the public network, path information of a tunnel that a packet between any two of the local area networks should pass by when being transmitted in the public network. The path information of the tunnel includes: which routers the packet passes by when being transmitted in the tunnel, and which interface of the router the packet passes by.

Specifically, referring to FIG. 1, L2VPN C includes 3 local area networks N1, N2, and N5. There are 6 directions for forwarding a packet between local area networks: a direction in which N1 forwards a packet to N2, a direction in which N2 forwards a packet to N1, a direction in which N1 forwards a packet to N5, a direction in which N5 forwards a packet to N1, a direction in which N2 forwards a packet to N5, and a direction in which N5 forwards a packet to N2.

The network controller accordingly needs to calculate, according to the information about the connection between each local area network of L2VPN C and the public network and the routing information of each router in the public network, path information of 6 tunnels that the packet should pass by when being forwarded. Only a direction in which N1 forwards a packet to N2, and a direction in which N1 forwards a packet to N5 are used as an example herein:

it is assumed that path information of tunnel T2 in the direction in which N1 forwards a packet to N2 is: a starting point of tunnel T2 is PE1, and tunnel T2 reaches P2 from interface 1 of PE1, and reaches PE2 from interface 2 of P2; and it is assumed that path information of tunnel T1 in the direction in which N1 forwards a packet to N5 is: a starting point of Tunnel T1 is PE1, and tunnel T1 reaches P1 from interface 3 of PE1, and reaches PE3 from interface 4 of P1.

No examples of path information of other tunnels are provided again.

Step 3003: Determine, according to the path information of each tunnel, forwarding information that each router forwards the packet along each tunnel, and allocate, to each router that each tunnel passes by, a label and processing information that is for the label before each router forwards the packet.

The determining, according to the path information of each tunnel, forwarding information that each router forwards the packet along each tunnel specifically is: determining, by the network controller according to the path information of each tunnel, which interface of the router is used to forward the packet to a next router along the tunnel by each router that each tunnel passes by. The network controller further needs to allocate, to each router that each tunnel passes by, the label and the processing information that is for the label according to the path information of each tunnel of the L2VPN.

Referring to FIG. 1, L2VPN C includes 3 local area networks: N1, N2, and N5, and correspondingly, in step 3003, the network controller calculates path information of 6 tunnels. The network controller needs to determine, according to path information of each tunnel and for a router that each tunnel passes by, forwarding information that the router forwards a packet along the tunnel, a label, and processing information that is for the label.

In view of limited space, only tunnel T2 of L2VPN C is used as an example herein, and no examples of other tunnels are provided again.

Path information of tunnel T2 in a direction in which N1 forwards a packet to N2 is: a starting point of tunnel T2 is PE1, and tunnel T2 reaches P2 from interface 1 of PE1, and reaches PE2 from interface 2 of P2.

The network controller determines that the forwarding information that PE1 forwards a packet along tunnel T2 is: PE1 forwards the packet to P2 from interface 1; and forwarding information that P2 forwards a packet along tunnel T2 is: P2 forwards the packet to PE2 from interface 2.

The network controller allocates a label and processing information that is for the label to a router that tunnel T2 passes by:

the network controller allocates a network label 201 and a tunnel label 11 to PE1, where the network label 201 identifies a local area network N2, that is, a destination local area network to which the packet is sent is N2; and the tunnel label 11 identifies that PE1 is located in tunnel T2;

label processing information allocated to PE1 is: adding one Ethernet Layer 2 header to a front end of a header of a frame structure of the packet, and inserting the network label 201 and the tunnel label 11 into the packet, so that in the frame structure of the packet, the network label 201 is at a rear end of the tunnel label 11, and the Ethernet Layer 2 header is at a front end of the tunnel label 11;

the label allocated to P2 is a tunnel label 12, where the tunnel label 12 is used to identify that P2 is located in tunnel T2;

label processing information allocated to P2 is: updating the tunnel label of the packet as the tunnel label 12; and label processing information allocated to PE2 is: deleting the tunnel label 12, the network label 201, and the Ethernet Layer 2 header.

Other tunnels may be deduced by analogy with reference to tunnel T2, and no further details are provided herein again.

Step 3004: Generate a flow table of each router, where each flow table separately includes matching item information and instruction item information, and each piece of instruction item information corresponds to each piece of matching item information.

The network controller generates the flow table of each router according to the routing control information of the router that each tunnel passes by.

The routing control information of the router includes: the forwarding information that the router forwards the packet along the tunnel, a label corresponding to the router in each tunnel, and processing information that is for the label before the router forwards the packet. A concept and a format of the flow table are the same as the description in Embodiment 2, and no further details are provided herein again.

Specifically, referring to FIG. 1, using tunnel T2 of L2VPN C as an example, situations of other tunnels may be deduced by analogy.

The routing control information determined by the network controller for PE1 is:

PE1 forwards a packet from interface 1 to P2; and allocates a network label 201 and a tunnel label 11 to PE1, where the network label 201 identifies local area network N2, that is, a destination local area network to which the packet is sent is N2; and the tunnel label 11 identifies that PE1 is located in tunnel T2. The label processing information allocated to PE1 is: adding one Ethernet Layer 2 header to a front end of a header of a frame structure of the packet, and inserting the network label 201 and the tunnel label 11 into the packet, so that in the frame structure of the packet, the network label 201 is at a rear end of the tunnel label 11, and the Ethernet Layer 2 header is at a front end of the tunnel label 11.

Correspondingly, the corresponding flow table generated when router PE1 forwards a packet in tunnel T2 is Table 4:

TABLE 4

Corresponding flow table when PE1 forwards a packet in tunnel T2

| PE1 Table 0 | IN_PORT = 2 | WRITE_METADATA(V1) GOTO_TABLE(1) |
| --- | --- | --- |
| PE1 Table 1 | VSI = V1 MAC = xx | APPLY_ACTIONS{ ADD_ETH_HDR, PUSH_MPLS(201), ...} WRITE_METADATA(T2) GOTO_TABLE(5) |
| PE1 Table 5 | TUNNEL_ID = T2 | APPLY_ACTIONS{ PUSH_MPLS(11), ..., OUTPUT(1) } |

VSI=V1 and MAC=xx are the same as the description in Embodiment 2.

The routing control information determined by the network controller for P2 is:

P2 forwards a packet from interface 2 to PE2; and the label allocated to P2 is the tunnel label 12, where the tunnel label 12 is used to identify that P2 is located in tunnel T2; and the label processing information allocated to P2 is: updating the tunnel label of the packet as the tunnel label 12.

Correspondingly, a corresponding flow table generated when router PE1 forwards a packet in tunnel T2 is Table 5:

TABLE 5

Corresponding flow table when router P2 forwards a packet in tunnel T2

| P2 Table 6 | IN_LABEL = 11 | APPLY_ACTIONS{ SET_MPLS_LABEL(12), ..., OUTPUT(2) } |
| --- | --- | --- |

The routing control information determined by the network controller for PE2 is:

The label processing information allocated to PE2 is: deleting the tunnel label 12, the network label 201, and the Ethernet Layer 2 header.

In addition, as a tunnel egress router, PE2 needs to forward the packet from interface 5 of PE2 to destination network N2.

Therefore, a corresponding flow table generated when router PE2 forwards a packet in tunnel T2 is Table 6:

TABLE 6

Corresponding flow table when router PE2 forwards a packet in tunnel T2

| PE2 Table 6 | IN_LABEL = 12 | APPLY_ACTIONS{ POP_MPLS, ... } GOTO_TABLE(7) |
| --- | --- | --- |
| PE2 Table 7 | IN_LABEL = 201 | APPLY_ACTIONS{ POP_MPLS, DEL_ETH_HDR } WRITE_METADATA(V1) GOTO_TABLE(1) |
| PE2 Table 1 | VSI = V1 MAC = xx | APPLY_ACTIONS{ OUTPUT(5) } |

Step 3005: Send a flow table of each router to each router.

The network controller sends the flow table of each router to each router, so that each router forwards a packet according to the flow table.

Specifically, referring to FIG. 1, tunnel T2 of L2VPN C is used as an example. The network controller sends the flow table in Table 4 to router PE1; the network controller sends the flow table in Table 5 to router P2; and the network controller sends the flow table in Table 6 to router PE2. After receiving the flow table, each router stores the flow table, for forwarding a packet received in the future.

As can be seen from the foregoing, according to the technical solution of this embodiment, a network controller may be used to implement centralized management on routers in a public network, and routing information of each router in the public network and information about a connection between each router on a network edge of the public network and any local area network are acquired, so as to determine path information of a tunnel that a packet transmitted between any two local area networks of an L2VPN should pass by, and then to determine routing control information of each router, including forwarding information that each router forwards a packet along the tunnel, a label allocated by each router, and processing information that is for the label, and the routing control information of each router is sent to each router for storage, so that each router forwards the packet according to the routing control information of the router. In the prior art, in this process, only by running a label-related protocol between routers in a public network, a tunnel that a transmitted packet needs to pass by can be determined, so as to allocate a label and label processing information to the router, and generate corresponding routing control information of the router. Compared with the prior art, in this embodiment, when generating control information of the router in the public network, the router does not need to calculate a label protocol, and therefore, in this embodiment, a calculation overhead of the router in the public network is reduced.

In addition, in this embodiment, routing control information of a router is uniformly abstracted as flow table information, to facilitate centralized management on the routing control information, and facilitate extension of the routing control information, so that the router provides more functions, to meet forwarding requirements of different packets.

Embodiment 4

Figure 4:
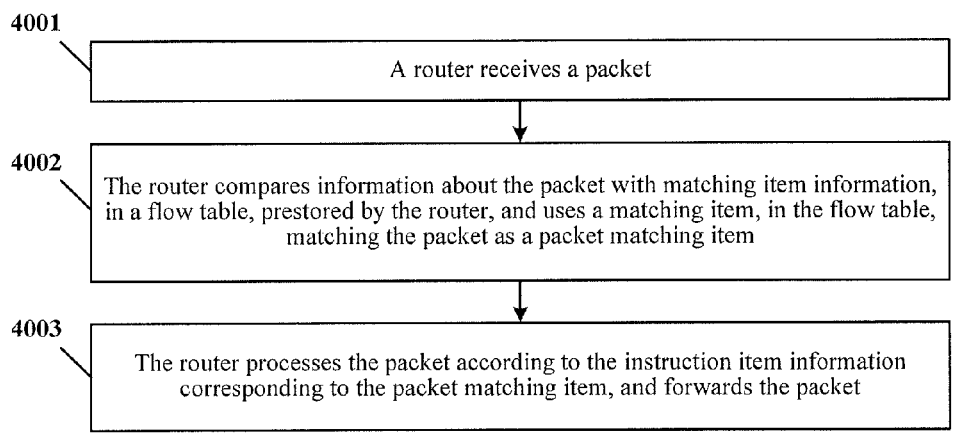
FIG. 4 is a schematic flowchart of a routing method according to Embodiment 4 of the application.

Referring to FIG. 4, this embodiment provides a routing method, and an application scenario of the method may be transmitting, by using a public network, a data packet between two local area networks, of a same L2VPN, distributed in two geographical positions. The public network may be, but not limited to, a public MPLS network, and may also be another Internet that can run a label protocol.

Steps of a process of the method provided in this embodiment are as follows:

Step 4001: A router receives a packet.

The router of this embodiment is a router in a public network, and a packet received by the router is a packet transmitted between any two local area networks, separately connected to the public network, in the Layer 2 Virtual Private Network.

Step 4002: The router compares information about the packet with matching item information, in a flow table, prestored by the router, and uses a matching item, in the flow table, matching the packet as a packet matching item.

Specifically, in this embodiment, in each flow table prestored in the router, each piece of instruction item information corresponds to each piece of matching item information.

Each piece of matching item information in the flow table includes: each piece of feature information that the packet needs to meet, and the matching item information in the flow table includes any one of or a combination of any two or more than two of the following:

a tunnel identifier of the tunnel, a label value in the packet, an ingress interface identifier of the packet, and a Virtual Switching Institution value of the Layer 2 Virtual Private Network.

Each piece of instruction item information in the flow table includes: forwarding information that a router forwards a packet, and processing information that is for the label before the router forwards the packet.

Each piece of instruction item information includes any one of or a combination of any two or more than two of the following:

adding or deleting a Layer 2 header of a packet, inserting the label corresponding to the router into the packet, updating the label value in the packet as the label corresponding to the router, deleting the label in the packet, and forwarding the forwarding information of the packet.

For more detailed description about the flow table, refer to the description of the flow table in Embodiment 2, and no further details are provided herein again.

The router in the public network prestores different flow tables, and when receiving a packet, the router compares packet information with the matching item information in the flow table, and if a feature of the packet matches the matching item information, uses a matching item of the flow table as packet matching item, and the router executes an instruction operation corresponding to the instruction item information corresponding to the packet matching item.

Step 4003: The router processes a packet according to the instruction item information corresponding to the packet matching item, and forwards the packet. The routing method is described in an application scenario of an L2VPN below by using a schematic topological diagram in which a public Multi-Protocol Label Switching network is connected to a local area network of a Layer 2 Virtual Private Network provided in FIG. 1.

Herein it is assumed that L2VPN A is a VLL, and includes two local area networks: N1 and N2, and it is assumed that N1 is connected to interface 2 of PE1, and N2 is connected to interface 5 of PE2. It is assumed that path information, predetermined by the network controller, of tunnel T2 in a direction in which N1 forwards a packet to N2 is: tunnel T2 reaches P2 from interface 1 of PE1, and then reaches PE2 from interface 2 of P2. Moreover, it is assumed that a flow table determined by the network controller for each router that tunnel T2 passes by is shown in Table 2.

Router PE1 receives the packet, and referring to FIG. 1, the packet received by PE1 may be from network N1, or may be from network N3. Obviously, a packet from network N3 does not belong to the VLL in this embodiment. Referring to Table 2, after PE1 receives the packet, if an ingress interface identifier of the packet is interface 2, and matches matching item information of Table 0 in PE1, router PE1 uses "IN_PORT=2" as packet matching item, and executes an instruction operation corresponding to instruction item information of Table 0. Specifically, router PE1 executes APPLY_ACTIONS{ADD_ETH_HDR}, adds one Ethernet Layer 2 header in front of a header of a frame structure of the packet as a new header of the packet; PE1 executes APPLY_ACTIONS{PUSH_MPLS(201)}, and inserts a network label 201 behind the Ethernet Layer 2 header of the packet; PE1 executes APPLY_ACTIONS{WRITE_METADATA(T2)}, to transmit parameter T2 to a next flow table Table 5 for use; PE1 executes APPLY_ACTIONS{GOTO_TABLE(5)}, to go to Table 5 and execute Table 5; PE1 continues to execute an instruction in instruction item information in Table 5; and PE1 executes APPLY_ACTIONS{ PUSH_MPLS(11)}, and inserts a tunnel label 11 behind the Ethernet Layer 2 header of the packet, and in this case, the network label 201 is located behind the tunnel label 11; PE1 executes APPLY_ACTIONS{ OUTPUT(1)}, and forwards the packet from interface 1 of the router to router P2.

For packet routing processes of router P2 and router PE2, refer to the description of the packet routing process of router PE1. Because different routers prestore different flow tables, matching item information and instruction item information of flow tables of different routers are different, and the performed operations are also different. Routing processes of P2 and PE2 are not described herein again.

As can be seen from the foregoing, according to the technical solution of this embodiment, when forwarding a packet from a local area network, a router in a public network no longer needs to run a label-related protocol, but mechanically compares a matching item of a flow table with corresponding information in the packet according to the prestored flow table, and then processes and forwards the packet according to an instruction in an instruction item corresponding to the matched matching item. This embodiment reduces a calculation overhead of a router in a public network.

Embodiment 5

Figure 5:
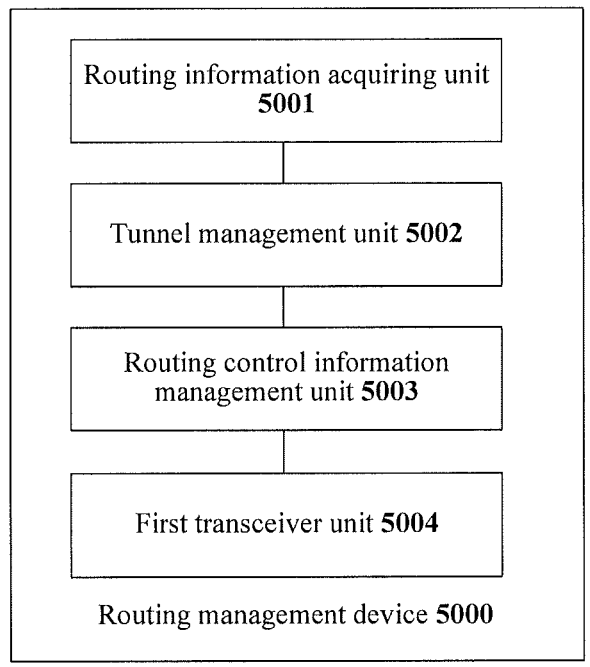
FIG. 5 is a schematic structural diagram of a network controller according to Embodiment 5 of the application.

Referring to FIG. 5, this embodiment provides a network controller 5000, including a routing information acquiring unit 5001, a tunnel management unit 5002, a routing control information management unit 5003, and a first transceiver unit 5004.

The routing information acquiring unit 5001 is in communication connection with the tunnel management unit 5002, and is configured to pre-acquire routing information of each router in a public network, and acquire information about a connection between each local area network of a Layer 2 Virtual Private Network and the public network, and transmit the acquired routing information of each router in the public network and information about the connection between each local area network of the Layer 2 Virtual Private Network and the public network to the tunnel management unit 5002. For a detailed working principle of the unit, reference may be made to step 2001 in Embodiment 1, where the public network may be, but not limited to, a public MPLS network. The Layer 2 Virtual Private Network includes a public network, and at least two local area networks connected by using the public network. Definitions of the routing information of the router and the information about the connection between each local area network and the public network are the same as the description in Embodiment 1, and no further details are provided herein again.

The tunnel management unit 5002 is in communication connection with the routing control information management unit 5003, and is configured to determine, according to the routing information of each router and the information about the connection between each local area network of the Layer 2 Virtual Private Network and the public network that are transmitted by the routing information acquiring unit 5001, path information of a tunnel that a packet between any two local area networks should pass by when being transmitted in the public network, and send the path information of each tunnel to the routing control information management unit 5003. For a detailed working principle of the unit, refer to step 2002 of Embodiment 1. For the description of the path information of the tunnel, refer to the description in Embodiment 1, which is not further provided herein.

The routing control information management unit 5003 is configured to determine, according to the path information of each tunnel, forwarding information that each router forwards a packet along each tunnel, allocate, to each router that each tunnel passes by, a label and processing information that is for the label before each router forwards the packet, and send routing control information of each router to the first transceiver unit 5004. For a working principle of the unit, reference may be made to step 2003 in Embodiment 1.

The label is a public Multi-Protocol Label Switching label, and the routing control information includes: the forwarding information that each router forwards the packet along each tunnel, the label corresponding to each router in each tunnel, and the processing information that is for the label before each router forwards the packet.

The first transceiver unit 5004 is in communication connection with the routing control information management unit 5003, and is configured to receive the routing control information of each router sent by the routing control information management unit 5003, and send each piece of routing control information to each router by using a network protocol, so that each router forwards a packet according to each piece of routing control information. A working principle of the unit corresponds to step 2004 in Embodiment 1.

The routing control information management unit 5003 of the network controller 5000 provided in this embodiment is, configured to allocate, to each router that each tunnel passes by, a label and processing information that is for the label before each router forwards the packet, and is specifically configured to:

allocate a network label and a tunnel label to each ingress router according to the path information of each tunnel, where the ingress router is: each edge router at each tunnel ingress, where the edge router is a router on an edge of the public network, each network label corresponds to each local area network, and each tunnel label corresponds to each tunnel in which the router is located, and the determining processing information that is for the label before each ingress router forwards the packet is: adding a Layer 2 header to a front end of a header of a frame structure of the packet, and inserting, into the packet, the network label corresponding to a destination local area network of the packet, and the tunnel label corresponding to the tunnel that the packet should pass by, so that in the frame structure of the packet, the network label is at a rear end of the tunnel label, and the Layer 2 header is at a front end of the tunnel label; and allocate each tunnel label to each transit router according to the path information of each tunnel, where each transit router is: any non-edge router in each tunnel;

the determining processing information that is for the label before each transit router forwards the packet is: updating a label value in the packet as: the tunnel label, corresponding to the transit router, in the tunnel that the packet should pass by; and the determining, according to the path information of each tunnel, processing information that is for the label before each egress router forwards the packet is: deleting the Layer 2 header, the tunnel label, and the network label that are in the packet.

The network controller provided in this embodiment implements the routing management method provided in Embodiment 1.

As can be seen from the foregoing, according to the technical solution of this embodiment, a network controller may be used to implement centralized management on routers in a public network, and routing information of each router in the public network and information about a connection between each router on a network edge of the public network and any local area network are acquired, so as to determine path information of a tunnel that a packet transmitted between any two local area networks of an L2VPN should pass by, and then, to determine routing control information of each router, including forwarding information that each router forwards a packet along the tunnel, a label allocated by each router, and processing information that is for the label, and the routing control information of each router is sent to each router for storage, so that each router forwards the packet according to the routing control information of the router. In the prior art, in this process, only by running a label-related protocol between routers in a public network, a tunnel that a transmitted packet needs to pass by can be determined, so as to allocate a label and label processing information to the router, and generate corresponding routing control information of the router. Compared with the prior art, in this embodiment, when generating control information of the router in the public network, the router does not need to calculate a label protocol, and therefore, in this embodiment, a calculation overhead of the router in the public network is reduced.

Embodiment 6

Figure 6:
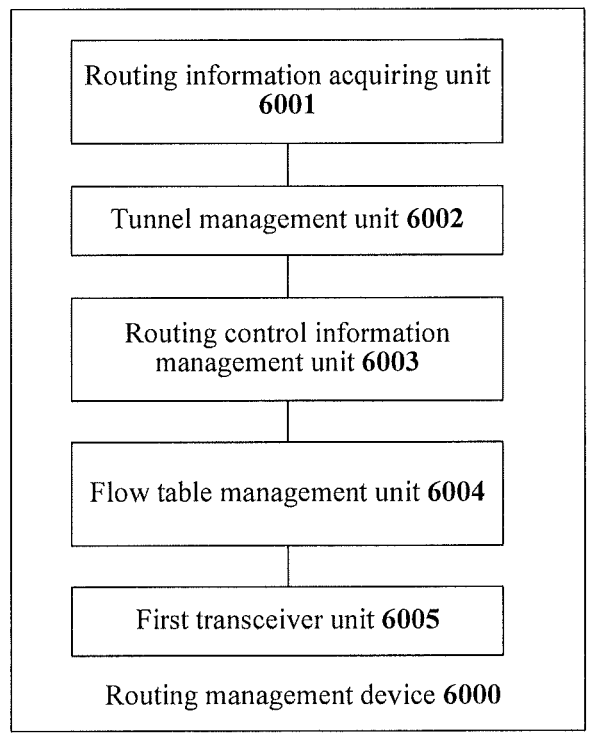
FIG. 6 is a schematic structural diagram of a network controller according to Embodiment 6 of the application.

Referring to FIG. 6, this embodiment provides a network controller 6000, including a routing information acquiring unit 6001, a tunnel management unit 6002, a routing control information management unit 6003, a flow table management unit 6004, and a first transceiver unit 6005. A working principle of each part is as follows:

The routing information acquiring unit 6001 is in communication connection with the tunnel management unit 6002, and is configured to pre-acquire routing information of each router in a public network, acquire information about a connection between each local area network of a Layer 2 Virtual Private Network and the public network, and transmit the acquired routing information of each router in the public network and information about the connection between each local area network of the Layer 2 Virtual Private Network and the public network to the tunnel management unit 6002. For a detailed working principle of the unit, reference may be made to step 3001 in Embodiment 2, where the public network may be, but not limited to, a public MPLS network. The Layer 2 Virtual Private Network includes a public network, and at least two local area networks connected by using the public network. Definitions of the routing information of the router and the information about the connection between each local area network and the public network are the same as the description in Embodiment 1, and no further details are provided herein again.

The tunnel management unit 6002 is in communication connection with the routing control information management unit 6003, and is configured to determine, according to the routing information of each router and the information about the connection between each local area network and the public network of the Layer 2 Virtual Private Network that are transmitted by the routing information acquiring unit 6001, path information of a tunnel that a packet between any two of the local area networks should pass by when being transmitted in the public network, and send the path information of each tunnel to the routing control information management unit 6003. For a detail working principle of the unit, refer to step 3002 in Embodiment 2. For the description of the path information of the tunnel, refer to the description in Embodiment 1, which is not further provided herein.

The routing control information management unit 6003 is in communication connection with the flow table management unit 6004, and is configured to determine, according to the path information of each tunnel, forwarding information that each router forwards a packet along each tunnel, allocate, to each router that each tunnel passes by, a label and processing information that is for the label before each router forwards the packet, and send each piece of routing control information of each router to the flow table management unit 6004.

For a working principle of the unit, reference may be made to step 3003 in Embodiment 2.

The label is a public Multi-Protocol Label Switching label, and the routing control information includes: the forwarding information that each router forwards the packet along each tunnel, the label corresponding to each router in each tunnel, and the processing information that is for the label before each router forwards the packet.

The flow table management unit 6004 is connected between the routing control information management unit 6003 and the first transceiver unit 6005, and the flow table management unit 6004 is configured to generate a flow table of each router according to the routing control information, input by the routing control information management unit 6003, of each router, and transmit the flow table to the first transceiver unit 6005. For a working principle of the unit, reference may be made to step 3004 in Embodiment 2 and related description of the flow table.

The flow table of each router separately includes matching item information and instruction item information, and each piece of instruction item information corresponds to each piece of matching item information.

The first transceiver unit 6005 is in communication connection with the flow table management unit 6004, and is configured to receive a flow table of each router sent by the flow table management unit 6004, and send the flow table of each router to each router by using a network protocol, so that each router forwards a packet according to the flow table of each router. A working principle of the unit corresponds to step 3005 in Embodiment 2.

The routing control information management unit 6003 of the network controller 6000 provided in this embodiment is, configured to allocate, to each router that each tunnel passes by, a label and processing information that is for the label before each router forwards the packet, and is specifically configured to:

allocate a network label and a tunnel label to each ingress router according to the path information of each tunnel, where the ingress router is: each edge router at each tunnel ingress, where the edge router is a router on an edge of the public network, each network label corresponds to each local area network, and each tunnel label corresponds to each tunnel in which the router is located, and the determining processing information that is for the label before each ingress router forwards the packet is: adding a Layer 2 header to a front end of a header of a frame structure of the packet, and inserting, into the packet, the network label corresponding to a destination local area network of the packet, and the tunnel label corresponding to the tunnel that the packet should pass by, so that in the frame structure of the packet, the network label is at a rear end of the tunnel label, and the Layer 2 header is at a front end of the tunnel label; and allocate each tunnel label to each transit router according to the path information of each tunnel, where each transit router is: any non-edge router in each tunnel;

the determining processing information that is for the label before each transit router forwards the packet is: updating a label value in the packet as: the tunnel label, corresponding to the transit router, in the tunnel that the packet should pass by; and the determining, according to the path information of each tunnel, processing information that is for the label before each egress router forwards the packet is: deleting the Layer 2 header, the tunnel label, and the network label that are in the packet.

The network controller provided in this embodiment implements the process of the routing management method provided in Embodiment 2.

As can be seen from the foregoing, in addition to the beneficial effects of Embodiment 4, this embodiment further has the following beneficial effects:

Routing control information of a router is uniformly abstracted as flow table information, to facilitate centralized management on the routing control information, and facilitate extension of the routing control information, so that the router provides more functions, to meet forwarding requirements of different packets.

Embodiment 7

Figure 7:
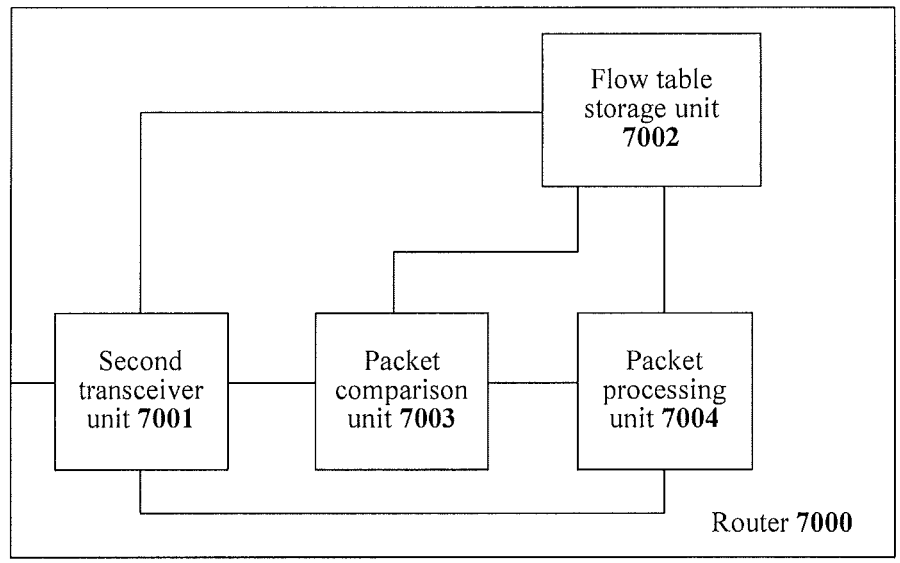
FIG. 7 is a schematic structural diagram of a router according to Embodiment 7 of the application.

Referring to FIG. 7, this embodiment provides a router 7000, including: a second transceiver unit 7001, a flow table storage unit 7002, a packet comparison unit 7003, and a packet processing unit 7004.

The second transceiver unit 7001 is configured to perform external communication, including: receiving a flow table of a router sent by a peripheral device such as a network controller, and receiving and forwarding a packet. The second transceiver unit 7001 is in communication connection with the flow table storage unit 7002, and sends the received flow table to the flow table storage unit 7002.

The flow table storage unit 7002 is configured to store information, where the stored information includes: a flow table of the router.

The flow table includes matching item information and instruction item information, and each piece of instruction item information corresponds to each piece of matching item information. Each piece of matching item information in the flow table includes: feature information that a packet needs to meet, and each piece of instruction item information includes: forwarding information that the router forwards the packet, and processing information that is for a label before the router forwards the packet.

The second transceiver unit 7001 is in communication connection with the packet comparison unit 7003, and is configured to receive a packet, between two local area networks, transmitted in a public network, and transmit the packet to the packet comparison unit 7003.

The packet comparison unit 7003 is further separately in communication connection with the flow table storage unit 7002 and the packet processing unit 7004, and is configured to compare, according to the packet received by the second transceiver unit 7001 and the flow table prestored by the flow table storage unit 7002, information about the packet with the matching item information in the flow table, and use a matching item, in the flow table, matching the packet as a packet matching item.

The packet processing unit 7004 is separately in communication connection with the flow table storage unit 7002 and the second transceiver unit 7001, and is configured to process, according to the instruction item information corresponding to the packet matching item, the packet transmitted by the packet comparison unit 7003, and send the processed packet to the second transceiver unit 7001.

The router provided in this embodiment implements the process of the routing method provided in Embodiment 3. Specific processes are not provided herein again.

As can be seen from the foregoing, according to the technical solution of this embodiment, when forwarding a packet from a local area network, a router in a public network no longer needs to run a label-related protocol, but processes and forwards the packet according to a prestored flow table of the router. This embodiment reduces a calculation overhead of a router in a public network.

Embodiment 8

Figure 8:
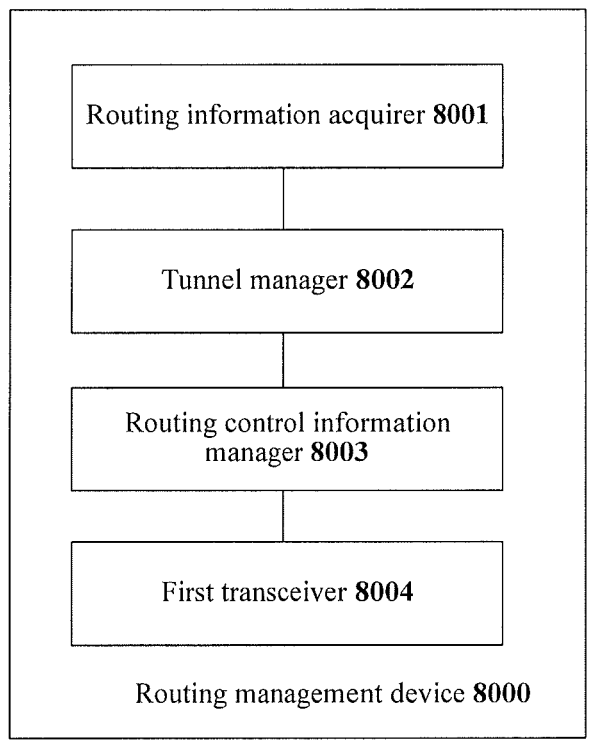
FIG. 8 is a schematic structural diagram of a network controller according to Embodiment 8 of the application.

Referring to FIG. 8, this embodiment provides a network controller 8000, including a routing information acquirer 8001, a tunnel manager 8002, a routing control information manager 8003, and a first transceiver 8004.

The routing information acquirer 8001 is connected to the tunnel manager 8002, and is configured to pre-acquire routing information of each router in a public network, and acquire information about a connection between each local area network of a Layer 2 Virtual Private Network and the public network, and transmit the acquired routing information of each router in the public network and information about the connection between each local area network of the Layer 2 Virtual Private Network and the public network to the tunnel manager 8002. For a detailed working principle of the component, reference may be made to step 2001 in Embodiment 1, where the public network may be, but not limited to, a public MPLS network. The Layer 2 Virtual Private Network includes a public network, and at least two local area networks connected by using the public network. Definitions of the routing information of the router and the information about the connection between each local area network and the public network are the same as the description in Embodiment 1, and no further details are provided herein again.

The tunnel manager 8002 is connected to the routing control information manager 8003, and is configured to determine, according to the routing information of each router and the information about the connection between each local area network of the Layer 2 Virtual Private Network and the public network that are transmitted by the routing information acquirer 8001, path information of a tunnel that a packet between any two of the local area networks should pass by when being transmitted in the public network, and send the path information of each tunnel to the routing control information manager 8003. For a detailed working principle of the component, refer to step 2002 in Embodiment 1. For the description of the path information of the tunnel, refer to the description in Embodiment 1, which is not further provided herein.

The routing control information manager 8003 is configured to determine, according to the path information of each tunnel, forwarding information that each router forwards a packet along each tunnel, allocate, to each router that each tunnel passes by, a label and processing information that is for the label before each router forwards the packet, and send each piece of routing control information of each router to the first transceiver 8004. For a working principle of the component, reference may be made to step 2003 in Embodiment 1.

The label is a public Multi-Protocol Label Switching label, and the routing control information includes: the forwarding information that each router forwards the packet along each tunnel, the label corresponding to each router in each tunnel, and the processing information that is for the label before each router forwards the packet.

The first transceiver 8004 is connected to the routing control information manager 8003, and is configured to receive the routing control information of each router sent by the routing control information manager 8003, and send each piece of routing control information to each router by using a network protocol, so that each router forwards a packet according to each piece of routing control information. A working principle of the component corresponds to step 2004 in Embodiment 1.

The routing control information manager 8003 of the network controller 8000 provided in this embodiment is configured to allocate, to each router that each tunnel passes by, a label and processing information that is for the label before each router forwards the packet, and is specifically configured to:

allocate a network label and a tunnel label to each ingress router according to the path information of each tunnel, where the ingress router is: each edge router at each tunnel ingress, where the edge router is a router on an edge of the public network, each network label corresponds to each local area network, and each tunnel label corresponds to each tunnel in which the router is located, and the determining processing information that is for the label before each ingress router forwards the packet is: adding a Layer 2 header to a front end of a header of a frame structure of the packet, and inserting, into the packet, the network label corresponding to a destination local area network of the packet, and the tunnel label corresponding to the tunnel that the packet should pass by, so that in the frame structure of the packet, the network label is at a rear end of the tunnel label, and the Layer 2 header is at a front end of the tunnel label; and allocate each tunnel label to each transit router according to the path information of each tunnel, where each transit router is: any non-edge router in each tunnel;

the determining processing information that is for the label before each transit router forwards the packet is: updating a label value in the packet as: the tunnel label, corresponding to the transit router, in the tunnel that the packet should pass by; and the determining, according to the path information of each tunnel, processing information that is for the label before each egress router forwards the packet is: deleting the Layer 2 header, the tunnel label, and the network label that are in the packet.

The network controller provided in this embodiment implements the routing management method provided in Embodiment 1.

As can be seen from the foregoing, according to the technical solution of this embodiment, a network controller may be used to implement centralized management on routers in a public network, and routing information of each router in the public network and information about a connection between each router on a network edge of the public network and any local area network are acquired, so as to determine path information of a tunnel that a packet transmitted between any two local area networks of an L2VPN should pass by, and then, to determine routing control information of each router, including forwarding information that each router forwards a packet along the tunnel, a label allocated by each router, and processing information that is for the label, and the routing control information of each router is sent to each router for storage, so that each router forwards the packet according to the routing control information of the router. In the prior art, in this process, only by running a label-related protocol between routers in a public network, a tunnel that a transmitted packet needs to pass by can be determined, so as to allocate a label and label processing information to the router, and generate corresponding routing control information of the router. Compared with the prior art, in this embodiment, when generating control information of the router in the public network, the router does not need to calculate a label protocol, and therefore, in this embodiment, a calculation overhead of the router in the public network is reduced.

Embodiment 9

Figure 9:
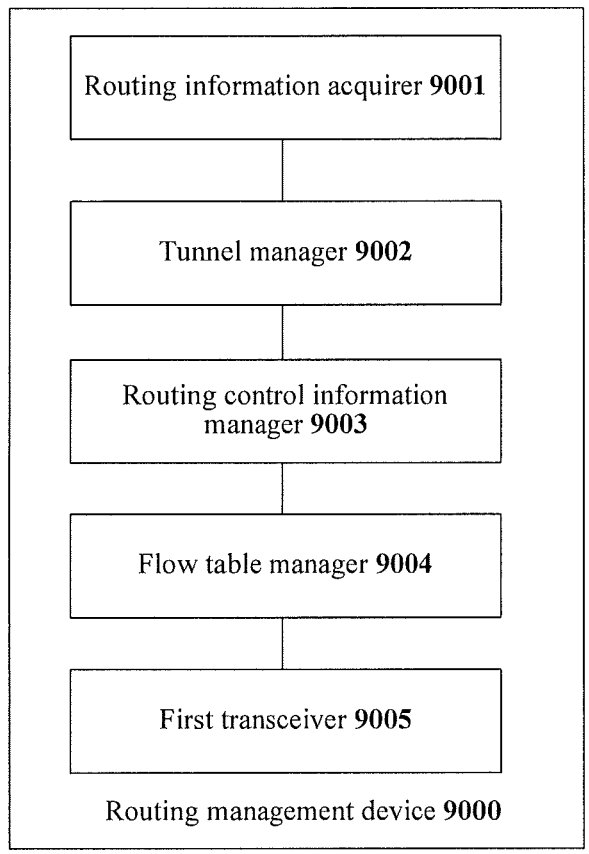
FIG. 9 is a schematic structural diagram of a network controller according to Embodiment 9 of the application.

Referring to FIG. 9, this embodiment provides a network controller 9000, including a routing information acquirer 9001, a tunnel manager 9002, a routing control information manager 9003, a flow table manager 9004, and a first transceiver 9005. A working principle of each part is as follows:

The routing information acquirer 9001 is connected to the tunnel manager 9002, and is configured to pre-acquire routing information of each router in a public network, acquire information about a connection between each local area network of a Layer 2 Virtual Private Network and the public network, and transmit the acquired routing information of each router in the public network and information about the connection between each local area network of the Layer 2 Virtual Private Network and the public network to the tunnel manager 9002. For a detailed working principle of the component, reference may be made to step 3001 in Embodiment 2, where the public network may be, but not limited to, a public MPLS network. The Layer 2 Virtual Private Network includes a public network, and at least two local area networks connected by using the public network. Definitions of the routing information of the router and the information about the connection between each local area network and the public network are the same as the description in Embodiment 1, and no further details are provided herein again.

The tunnel manager 9002 is connected to the routing control information manager 9003, and is configured to determine, according to the routing information of each router and the information about the connection between each local area network of the Layer 2 Virtual Private Network and the public network that are transmitted by the routing information acquirer 9001, path information of a tunnel that a packet between any two local area networks should pass by when being transmitted in the public network, and send the path information of each tunnel to the routing control information manager 9003. For a detailed working principle of the component, refer to step 3002 in Embodiment 2. For the description of the path information of the tunnel, refer to the description in Embodiment 1, which is not further provided herein.

The routing control information manager 9003 is connected to the flow table manager 9004, and is configured to determine, according to the path information of each tunnel, forwarding information that each router forwards a packet along each tunnel, allocate, to each router that each tunnel passes by, a label and processing information that is for the label before each router forwards the packet, and send each piece of routing control information of each router to the flow table manager 9004.

For a working principle of the component, reference may be made to step 3003 in Embodiment 2.

The label is a public Multi-Protocol Label Switching label, and the routing control information includes: the forwarding information that each router forwards the packet along each tunnel, the label corresponding to each router in each tunnel, and the processing information that is for the label before each router forwards the packet.

The flow table manager 9004 is connected between the routing control information manager 9003 and the first transceiver 9005, and the flow table manager 9004 is configured to generate a flow table of each router according to the routing control information of each router input by the routing control information manager 9003, and transmit the flow table to the first transceiver 9005. For a working principle of the component, reference may be made to step 3004 in Embodiment 2 and related description of the flow table.

The flow table of each router separately includes matching item information and instruction item information, and each piece of instruction item information corresponds to each piece of matching item information.

The first transceiver 9005 is connected to the flow table manager 9004, and is configured to receive the flow table of each router sent by the flow table manager 9004, and send the flow table of each router to each router by using a network protocol, so that each router forwards a packet according to the flow table of each router. A working principle of the component corresponds to step 3005 in Embodiment 2.

The routing control information manager 9003 of the network controller 9000 provided in this embodiment is configured to allocate, to each router that each tunnel passes by, a label and processing information that is for the label before each router forwards the packet, and is specifically configured to:

allocate a network label and a tunnel label to each ingress router according to the path information of each tunnel, where the ingress router is: each edge router at each tunnel ingress, where the edge router is a router on an edge of the public network, each network label corresponds to each local area network, and each tunnel label corresponds to each tunnel in which the router is located, and the determining processing information that is for the label before each ingress router forwards the packet is: adding a Layer 2 header to a front end of a header of a frame structure of the packet, and inserting, into the packet, the network label corresponding to a destination local area network of the packet, and the tunnel label corresponding to the tunnel that the packet should pass by, so that in the frame structure of the packet, the network label is at a rear end of the tunnel label, and the Layer 2 header is at a front end of the tunnel label; and allocate each tunnel label to each transit router according to the path information of each tunnel, where each transit router is: any non-edge router in each tunnel; the determining processing information that is for the label before each transit router forwards the packet is: updating a label value in the packet as: the tunnel label, corresponding to the transit router, in the tunnel that the packet should pass by; and the determining, according to the path information of each tunnel, processing information that is for the label before each egress router forwards the packet is: deleting the Layer 2 header, the tunnel label, and the network label that are in the packet.

The network controller provided in this embodiment implements the process of the routing management method provided in Embodiment 2.

As can be seen from the foregoing, in addition to the beneficial effects of Embodiment 7, this embodiment further has the following beneficial effects:

Routing control information of a router is uniformly abstracted as flow table information, to facilitate centralized management on the routing control information, and facilitate extension of the routing control information, so that the router provides more functions, to meet forwarding requirements of different packets.

Embodiment 10

Figure 10:
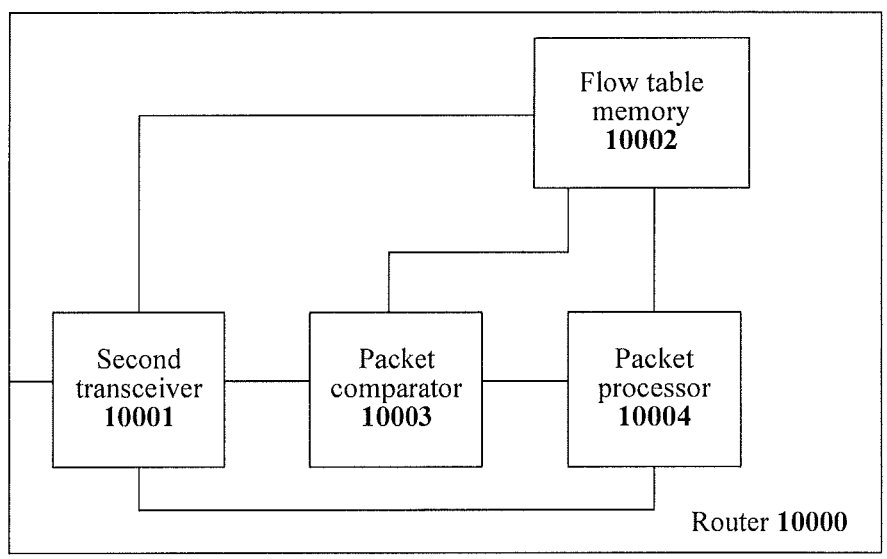
FIG. 10 is a schematic structural diagram of a router according to Embodiment 10 of the application.

Referring to FIG. 10, this embodiment provides a router 10000, including: a second transceiver 10001, a flow table memory 10002, a packet comparator 10003, and a packet processor 10004.

The second transceiver 10001 is configured to perform external communication, including: receiving a flow table of a router sent by a peripheral device such as a network controller, and receiving and forwarding a packet. The second transceiver 10001 is in communication connection with the flow table memory 10002, and sends the received flow table to the flow table memory 10002.

The flow table memory 10002 is configured to store information, where the stored information includes: a flow table of a router.

The flow table includes matching item information and instruction item information, and each piece of instruction item information corresponds to each piece of matching item information. Each piece of matching item information in the flow table includes: feature information that a packet needs to meet, and each piece of instruction item information includes: forwarding information that the router forwards the packet, and processing information that is for a label before the router forwards the packet.

The second transceiver 10001 is connected to the packet comparator 10003, and is configured to receive a packet, between two local area networks, transmitted in a public network, and transmit the packet to the packet comparator 10003.

The packet comparator 10003 is further separately connected to the flow table memory 10002 and the packet processor 10004, and is configured to compare, according to the packet received by the second transceiver 10001 and the flow table prestored by the flow table memory 10002, information about the packet with the matching item information in the flow table, and use a matching item, in the flow table, matching the packet as a packet matching item.

The packet processor 10004 is separately in communication connection with the flow table memory 10002 and the second transceiver 10001, and is configured to process, according to the instruction item information corresponding to the packet matching item, the packet transmitted by the packet comparator 10003, and send the processed packet to the second transceiver 10001.

The router provided in this embodiment implements the process of the routing method provided in Embodiment 3. Specific processes are not provided herein again.

As can be seen from the foregoing, according to the technical solution of this embodiment, when forwarding a packet from a local area network, a router in a public network no longer needs to run a label-related protocol, but processes and forwards the packet according to a prestored flow table of the router. This embodiment reduces a calculation overhead of a router in a public network.

The described apparatus embodiments are merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. A person of ordinary skill in the art may understand and implement the embodiments of the application without creative efforts.

Based on the foregoing descriptions of the embodiments, a person skilled in the art may clearly understand that each implementation manner may be implemented by software in addition to a necessary general hardware platform or by hardware. Based on such an understanding, the foregoing technical solutions essentially or the part contributing to the prior art may be implemented in a form of a software product. The software product is stored in a computer readable storage medium, such as a ROM/RAM, a hard disk, or an optical disc, and includes several instructions for instructing a computer device (which may be a personal computer, a server, a network device, or the like) to perform the methods described in the embodiments or some parts of the embodiments.

The foregoing implementation manners are not intended to limit the protection scope of the technical solutions. Any modification, equivalent replacement, and improvement made without departing from the spirit and principle of the foregoing implementation manners shall fall within the protection scope of the technical solutions.

What is claimed is:

1. A routing management method, comprising:
receiving, by a network controller, a request for creating a Layer 2 Virtual Private Network, wherein the Layer 2 Virtual Private Network comprises a public network, and at least two local area networks connected by using the public network;
determining, by the network controller according to routing information of each router in the public network and information about a connection between each local area network and the public network, path information of a tunnel that a packet between any two of the local area networks should pass by when being transmitted in the public network;
determining, according to the path information of each tunnel, forwarding information that each router forwards the packet along each tunnel, and allocating, to each router that each tunnel passes by, a label and processing information that is for the label before each router forwards the packet, wherein the label is a public Multi-Protocol Label Switching label; and
sending each piece of routing control information to each router, wherein the routing control information comprises: the forwarding information that each router forwards the packet along each tunnel, a label corresponding to each router in each tunnel, and the processing information that is for the label before each router forwards the packet, so that each router forwards the packet according to each piece of routing control information, wherein
before the sending each piece of routing control information to each router, and
after the determining, according to the path information of each tunnel, forwarding information that each router forwards the packet along each tunnel, the method further comprises:
generating a flow table of each router, wherein each flow table separately comprises matching item information and instruction item information, and each piece of instruction item information corresponds to each piece of matching item information;
determining the matching item information in each flow table according to the label corresponding to each router in each tunnel, and the path information of each tunnel; and
determining each piece of instruction item information according to the forwarding information that each router forwards the packet along each tunnel, the label corresponding to each router in each tunnel, and the processing information that is for the label before each router forwards the packet,
so that after receiving the packet, the router forwards the packet according to the instruction item information, in the flow table, corresponding to the matching item information that matches the packet; and
the sending each piece of routing control information to each router comprising: sending the flow table of each router to each router.

2. The routing management method according to claim 1, wherein
the matching item information in each flow table comprises any one of or a combination of any two or more than two of the following:
a tunnel identifier of the tunnel, a label value in the packet, an ingress interface identifier of the packet, and a Virtual Switching Institution value of the Layer 2 Virtual Private Network.

3. The routing management method according to claim 1, wherein
each piece of instruction item information comprises any one of or a combination of any two or more than two of the following:
adding or deleting a Layer 2 header of a packet, inserting the label corresponding to the router into the packet, updating the label value in the packet as the label corresponding to the router, deleting the label in the packet, and forwarding the forwarding information of the packet.

4. The routing management method according to claim 1, wherein
the allocating, to each router that each tunnel passes by, a label and processing information that is for the label before each router forwards the packet comprises:
allocating a network label and a tunnel label to each ingress router according to the path information of each tunnel, wherein
the ingress router is: each edge router at each tunnel ingress, wherein the edge router is a router on an edge of the public network, each network label corresponds to each local area network, and each tunnel label corresponds to each tunnel in which the router is located, and
the determining processing information that is for the label before each ingress router forwards the packet is: adding a Layer 2 header to a front end of a header of a frame structure of the packet, and inserting, into the packet, the network label corresponding to a destination local area network of the packet, and the tunnel label corresponding to the tunnel that the packet should pass by, so that in the frame structure of the packet, the network label is at a rear end of the tunnel label, and the Layer 2 header is at a front end of the tunnel label; and
allocating each tunnel label to each transit router according to the path information of each tunnel, wherein
each transit router is: any non-edge router in each tunnel;
the determining processing information that is for the label before each transit router forwards the packet is: updating a label value in the packet as: the tunnel label, corresponding to the transit router, in the tunnel that the packet should pass by; and
the determining, according to the path information of each tunnel, processing information that is for the label before each egress router forwards the packet is: deleting the Layer 2 header, the tunnel label, and the network label that are in the packet.

5. A routing method, comprising:
receiving, by a router, a packet, wherein the router is in a public network, the packet is a packet, in a Layer 2 Virtual Private Network, transmitted between any two local area networks separately connected to the public network;
comparing, by the router, information about the packet with matching item information, in a flow table, pre-stored by the router, and using a matching item, in the flow table, matching the packet as a packet matching item, wherein
in the flow table, each piece of instruction item information corresponds to each piece of matching item information, each piece of matching item information in the flow table comprises: each piece of feature information that the packet needs to meet, and
each piece of instruction item information in the flow table comprises: forwarding information that the router forwards the packet, and processing information that is for the label before the router forwards the packet; and
processing, by the router, the packet according to the instruction item information corresponding to the packet matching item, and forwarding the packet, wherein
the matching item information in each flow table comprises any one of or a combination of any two or more than two of the following:
a tunnel identifier of the tunnel, a label value in the packet, an ingress interface identifier of the packet, and a Virtual Switching Institution value of the Layer 2 Virtual Private Network.

6. The routing method according to claim 5, wherein each piece of instruction item information comprises any one of or a combination of any two or more than two of the following:
adding or deleting a Layer 2 header of a packet, inserting the label corresponding to the router into the packet, updating the label value in the packet as the label corresponding to the router, deleting the label in the packet, and forwarding the forwarding information of the packet.

7. A network controller, comprising:
a routing information acquirer;
a tunnel manager;
a routing control information manager; and
a first transceiver, wherein
the routing information acquirer is configured to pre-acquire routing information of each router in a public network, receive a request for creating a Layer 2 Virtual Private Network, acquire information about a connection between each local area network of the Layer 2 Virtual Private Network and the public network, and output the routing information of each router, and the information about the connection between each local area network and the public network to the tunnel manager, wherein the Layer 2 Virtual Private Network comprises a public network, and at least two local area networks connected by using the public network;
the tunnel manager is configured to determine, according to the path information of each tunnel, forwarding information that each router forwards the packet along each tunnel, allocate, to each router that each tunnel passes by, a label and processing information that is for the label before each router forwards the packet, wherein the label is a public Multi-Protocol Label Switching label, and output path information of the tunnel to the routing control information manager;
the routing control information manager is configured to determine, according to the path information of each tunnel, forwarding information that each router forwards the packet along each tunnel, allocate, to each router that each tunnel passes by, a label and processing information that is for the label before each router forwards the packet, and send each piece of routing control information of each router to the first transceiver, wherein the label is a public Multi-Protocol Label Switching label, and the routing control information comprises: the forwarding information that each router forwards the packet along each tunnel, the label corresponding to each router in each tunnel, and the processing information that is for the label before each router forwards the packet; and
the first transceiver is configured to send each piece of routing control information to each router, so that each router forwards the packet according to each piece of routing control information, wherein
the network controller further comprises a flow table manager, wherein
the flow table manager is connected between the routing control information manager and the first transceiver,
the flow table manager is configured to generate a flow table of each router according to the routing control information, input by the routing control information manager, of each router, and transmit the flow table to the first transceiver, wherein the flow table of each router separately comprises matching item information and instruction item information, and each piece of instruction item information corresponds to each piece of matching item information; and
the first transceiver is configured to send the flow table of each router to each router.

8. The network controller according to claim 7, wherein the routing control information manager is configured to allocate, to each router that each tunnel passes by, a label and processing information that is for the label before each router forwards the packet, and is configured to:
allocate a network label and a tunnel label to each ingress router according to the path information of each tunnel, wherein
the ingress router is: each edge router at each tunnel ingress, wherein the edge router is a router on an edge of the public network, each network label corresponds to each local area network, and each tunnel label corresponds to each tunnel in which the router is located, and
the determining processing information that is for the label before each ingress router forwards the packet is: adding a Layer 2 header to a front end of a header of a frame structure of the packet, and inserting, into the packet, the network label corresponding to a destination local area network of the packet, and the tunnel label corresponding to the tunnel that the packet should pass by, so that in the frame structure of the packet, the network label is at a rear end of the tunnel label, and the Layer 2 header is at a front end of the tunnel label; and
allocate each tunnel label to each transit router according to the path information of each tunnel, wherein
each transit router is: any non-edge router in each tunnel;
the determining processing information that is for the label before each transit router forwards the packet is: updating a label value in the packet as: the tunnel label, corresponding to the transit router, in the tunnel that the packet should pass by; and
the determining, according to the path information of each tunnel, processing information that is for the label before each egress router forwards the packet is: deleting the Layer 2 header, the tunnel label, and the network label that are in the packet.

9. A router, comprising:
a second transceiver;
a flow table memory;
a packet comparator; and
a packet processor, wherein
the second transceiver is configured to perform external communication, wherein the communication comprises receiving a flow table of the router, and receiving and forwarding a packet, wherein the packet is a packet, in a Layer 2 Virtual Private Network, transmitted between any two local area networks separately connected to a public network;

the memory is configured to store information, wherein the information comprises: a flow table of the router, wherein in the flow table, each piece of instruction item information corresponds to each piece of matching item information, each piece of matching item information in the flow table comprises: each piece of feature information that the packet needs to meet, and each piece of instruction item information in the flow table comprises: forwarding information that the router forwards the packet, and processing information that is for a label before the router forwards the packet;

the packet comparator is configured to compare information about the packet with the matching item information in the flow table, and use a matching item, in the flow table, matching the packet as a packet matching item; and the packet processor processes the packet according to the instruction item information corresponding to the packet matching item, wherein the matching item information in each flow table comprises any one of or a combination of any two or more than two of the following:

a tunnel identifier of the tunnel, a label value in the packet, an ingress interface identifier of the packet, and a Virtual Switching Institution value of the Layer 2 Virtual Private Network.

* * * * *

UNITED STATES PATENT AND TRADEMARK OFFICE
CERTIFICATE OF CORRECTION

PATENT NO. : 9,973,419 B2  
APPLICATION NO. : 14/817656  
DATED : May 15, 2018  
INVENTOR(S) : Yan Li et al.

Page 1 of 1

It is certified that error appears in the above-identified patent and that said Letters Patent is hereby corrected as shown below:

On the Title Page

Item [73] (Assignee), Line 13:  
Delete "Shenzen (CN)" and insert -- Shenzhen (CN) --, therefore.

Signed and Sealed this  
Tenth Day of July, 2018

Andrei Iancu  
*Director of the United States Patent and Trademark Office*